US011620859B2

(12) United States Patent
Sills et al.

(10) Patent No.: US 11,620,859 B2
(45) Date of Patent: Apr. 4, 2023

(54) BIOMETRIC AWARE OBJECT DETECTION AND TRACKING

(71) Applicant: Ultrahaptics IP Two Limited, Bristol (GB)

(72) Inventors: Maxwell Sills, San Francisco, CA (US); Aaron Smith, San Francisco, CA (US); David S. Holz, San Francisco, CA (US); Hongyuan (Jimmy) He, San Francisco, CA (US)

(73) Assignee: Ultrahaptics IP Two Limited, Bristol (GB)

( * ) Notice: Subject to any disclaimer, the term of this patent is extended or adjusted under 35 U.S.C. 154(b) by 0 days.

(21) Appl. No.: 16/941,396

(22) Filed: Jul. 28, 2020

(65) Prior Publication Data

US 2020/0356766 A1 Nov. 12, 2020

Related U.S. Application Data

(63) Continuation of application No. 15/611,784, filed on Jun. 2, 2017, now Pat. No. 10,733,429, which is a (Continued)

(51) Int. Cl.
*G06V 40/20* (2022.01)
*G06F 3/01* (2006.01)
*G06V 40/10* (2022.01)

(52) U.S. Cl.
CPC ............ *G06V 40/28* (2022.01); *G06F 3/017* (2013.01); *G06V 40/11* (2022.01); *G06V 40/117* (2022.01)

(58) Field of Classification Search
CPC ........... G06K 9/00355; G06K 9/00382; G06K 2009/00395; G06F 3/017
See application file for complete search history.

(56) References Cited

U.S. PATENT DOCUMENTS 6,002,808 A 12/1999 Freeman
6,421,453 B1 7/2002 Kanevsky et al.
(Continued)

FOREIGN PATENT DOCUMENTS

CN 101124534 2/2008
CN 102184014 A 9/2011
(Continued)

OTHER PUBLICATIONS

Bhutami, R., "What are the Ways of Calculating 2×2 Hessian Matrix for 2D Image of Pixel at (x,y) Position?," Quora, last updated May 2013, retrieved from the internet <http://www.quora.com/What-are-the-ways-of-calculating-2-x-2-hessian-m-atrix-for-2d-image-of-pixel-at-x-y-position> on Mar. 10, 2015, 4 pages.
(Continued)

*Primary Examiner* — Mark Roz
(74) *Attorney, Agent, or Firm* — Haynes Beffel & Wolfeld LLP; Ernest J. Beffel, Jr.; Paul A. Durdik

(57) ABSTRACT

The technology disclosed can provide methods and systems for identifying users while capturing motion and/or determining the path of a portion of the user with one or more optical, acoustic or vibrational sensors. Implementations can enable use of security aware devices, e.g., automated teller machines (ATMs), cash registers and banking machines, other secure vending or service machines, security screening apparatus, secure terminals, airplanes, automobiles and so forth that comprise sensors and processors employing optical, audio or vibrational detection mechanisms suitable for providing gesture detection, personal identification, user recognition, authorization of control inputs, and other machine control and/or machine communications applications. A virtual experience can be provided to the user in some implementations by the addition of haptic, audio and/or other sensory information projectors.

20 Claims, 13 Drawing Sheets

Related U.S. Application Data continuation of application No. 14/658,064, filed on Mar. 13, 2015, now Pat. No. 9,679,197.

(60) Provisional application No. 61/952,843, filed on Mar. 13, 2014.

(56) References Cited

U.S. PATENT DOCUMENTS

| | | | |
|---|---|---|---|
| 7,236,611 | B2 | 6/2007 | Roberts et al. |
| 8,542,320 | B2 | 9/2013 | Berestov et al. |
| 8,751,979 | B1 | 6/2014 | Socha |
| 8,781,234 | B2 | 7/2014 | Zhang et al. |
| 8,824,749 | B2 | 9/2014 | Leyvand et al. |
| 9,600,935 | B2 | 3/2017 | Cohen |
| 2005/0210105 | A1 | 9/2005 | Hirata et al. |
| 2006/0006235 | A1 | 1/2006 | Kurzweil et al. |
| 2007/0057764 | A1 | 3/2007 | Sato et al. |
| 2007/0203904 | A1 | 8/2007 | Ren et al. |
| 2008/0002860 | A1 | 1/2008 | Super et al. |
| 2008/0170776 | A1 | 7/2008 | Albertson et al. |
| 2008/0317292 | A1 | 12/2008 | Baker et al. |
| 2009/0239587 | A1 | 9/2009 | Negron et al. |
| 2010/0199229 | A1 | 8/2010 | Kipman et al. |
| 2011/0234631 | A1 | 9/2011 | Kim et al. |
| 2011/0279397 | A1 | 11/2011 | Rimon et al. |
| 2012/0030637 | A1 | 2/2012 | Dey et al. |
| 2012/0257797 | A1* | 10/2012 | Leyvand ............... G06V 40/16 382/118 |
| 2012/0281884 | A1 | 11/2012 | Whillock et al. |
| 2013/0014052 | A1 | 1/2013 | Frey et al. |
| 2013/0080898 | A1 | 3/2013 | Lavian et al. |
| 2013/0241832 | A1 | 9/2013 | Rimon et al. |
| 2014/0023247 | A1 | 1/2014 | Kuwahara et al. |
| 2014/0176310 | A1 | 6/2014 | Kotlicki |
| 2014/0189579 | A1 | 7/2014 | Rimon et al. |
| 2014/0253711 | A1* | 9/2014 | Balch ............... G06V 40/1312 348/77 |

FOREIGN PATENT DOCUMENTS

| | | |
|---|---|---|
| CN | 102696057 A | 9/2012 |
| CN | 103090862 A | 5/2013 |
| WO | 2006-090197 A1 | 8/2006 |

OTHER PUBLICATIONS

Grauman, K., et al., "Chapter 3—Local Features: Detection and Description," Visual Object Recognition: Synthesis Lectures on Artificual Intelligence and Machine Learning, Apr. 2011, retrieved from the internet :<www.morganclaypool.com/doi/abs/10.2200/S00332Ed1V01Y201103A- M011> on Mar. 12, 2015, pp. 1, 23-39.
Hladuvka, J., et al., "Exploiting Eigenvalues of the Hessian Matrix for Volume Decimation," CiteSeerx, Copyright 2001, retrieved from the internet: <http://citeseerx.isf.psu.edu/viewdoc/summary?doi=10. 1.167.- 565> on Mar. 12, 2015, fromVienna University of Technology, 7 pages.
Rudzki, M., "Vessel Detection Method Based on Eigenvalues of Hessian Matrix and its Applicability to Airway Tree Segmentation," XI International PhD Workshop, OWD 2009, Silesian University of Technology, Oct. 17-20, 2009, 6 pages.
ShinodaLab, "Visuo-Tactile Projector," YouTube Video, published on May 14, 2013, retrieved from the internet: <http://www.youtube.com/watch?v=Bb0hNMxxewg> on Mar. 12, 2015, 2 pages.
Shlens, J., "A Tutorial on Principal Component Analysis," Derivation, Discussion and Singular Value Decomposition, Version 1, Mar. 25, 2013, UCSD.edu, pp. 1-16.
Wikipedia, "Rotation Matrix," Wikipedia—the Free Encyclopedia, last modified Mar. 11, 2015, retrieved from the Internet: <http://en.wikipedia.org/w/index.php?title=Rotation.sub.—matrix&oldid-=650875954> on Mar. 12, 2015, 21 pages, cited byapplicant.
Wikipedia, "Transformation Matrix," Wikipedia—the Free Encyclopedia, last modified Mar. 5, 2015, retrieved from the Internet: <http://en.wikipedia.org/w/index.php?title=Transformation.sub.—matrix- &oldid=649936175> on Mar. 12, 2015, 8 pages.
PCT/US2015/032705—Written Opinion of the ISA, dated Sep. 15, 2015, 10 pages.
PCT/US2015/032705—International Search Report dated Sep. 15, 2015, 3 page.
"EigenSolver <_MatrixType> Class Template Reference," Reference Eigen Values Module, retrieved from the internet: <http://eigen luxfamily.org/dox/classEigen_1_1EigenSolver.html> on Mar. 12, 2015, pp. 1-8.
"Hessian Matrix of the Image," Matlab—Hessian Matrix of the Image—Stack Overflow, last edited Mar. 13, 2014, retrieved from the internet: <http://stackoverflow.com/questions/22378360/hessian-matrix-of-the-image> on Mar. 10, 2015, 3 pages.
"How Hessian Feature Detector Works?" Signal Processing Stack Exchange, last edited Oct. 2013, retrieved from the internet: <http://dsp.stackexchange.com/questions/10579/how0hessian-feature-detector-works> on Mar. 10, 2015, 3 pages.
"SVC Module," Reference, Eigen: SVC Module, retrieved from the internet: <http://eigen.luxfamily.org/dox/group__SVD__Module.html> on Mar. 12, 2015, 1 page.
Wikipedia, "Axis-angle Representation," Wikipedia—the Free Encyclopedia, last modified Dec. 30, 2014, retrieved from the internet: <http://en.wikipedia.org/w/index.php?title=Axis-angle_representation &oldid=640273193> on Mar. 12, 2015, 5 pages.
Wikipedia, "Euclidean Group," Wikipedia—the Free Encyclopedia, last modified Feb. 24, 2015, retrieved from the Internet: <http://en.wikipedia.org/w/index.php?title=Euclidean_group&oldid=648705193> on Mar. 12, 2015, 7 pages.
Wikipedia, "Multilateration," Wikipedia—the Free Encyclopedia, Nov. 16, 2012, retrieved from the internet: <http://en.wikipedia.org/w/index.php?title=Multilateration&oldid=523281858> on Mar. 12, 2015, 10 pages.
Wikipedia, "Rotation Group SO(3)," Wikipedia—the Free Encyclopedia, last modified Feb. 20, 2015, retrieved from the internet <http://en.wikipedia.org/w/index.php?title=Rotation_group_SO(3) &oldid=648012313> on Mar. 13, 2015, 17 pages.
U.S. Appl. No. 14/658,064—Notice of Allowance dated Feb. 17, 2017, 29 pages.
Wikipedia, "Affine Transmation," Wikipedia—the Free Encyclopedia, last modified Mar. 5, 2015, retrieved from the Internet <http://en.wikipedia.org/w/index.php?title=Affine.sub.—transformation-&oldid=650023248> on Mar. 12, 2015, 8 pages.
U.S. Appl. No. 15/611,784—Office Action dated Nov. 3, 2017, 27 pages.
Kanhangad, V., et al., "Combining 2D And 3D Hand Geometry Features for Biometric Verification", IEEE 2009, 6 pages.
Choras, M., et al., "Contactless Palmprint and Knuckle Biometrics for Mobile Devices", Springerlink, Dec. 8, 2009, 13 pages.
U.S. Appl. No. 15/611,784—Response to Office Action dated Nov. 3, 2017, filed Mar. 5, 2018, 14 pages.
U.S. Appl. No. 15/611,784—Office Action dated Apr. 12, 2018, 16 pages.
U.S. Appl. No. 15/611,784—Response to Office Action dated Apr. 12, 2018, filed Sep. 19, 2018, 18 pages.
U.S. Appl. No. 15/611,784—Advisory Action dated Oct. 9, 2018, 6 pages.
U.S. Appl. No. 15/611,784—Office Action dated Dec. 4, 2018, 17 pages.
U.S. Appl. No. 15/611,784—Response to Office Action dated Dec. 4, 2018, filed May 6, 2019, 13 pages.
U.S. Appl. No. 15/611,784—Final Office Action dated May 31, 2019, 18 pages.
Interactive Gaming Smart Vending Machine. Silikron Smart Vending, URL: https:///www.youtube.com/watch?v=tK17sXvzLtU, Dec. 12, 2013.
U.S. Appl. No. 15/611,784—Office Action dated Dec. 5, 2019, 19 pages.
Wong, Kie Yih Edward, et. al., "Palmprint Identification Using Sobel Operator," 10th International Conference on Control, automation, Robotics and Vision, Dec. 17-20, 2008, 4 pages.

(56) References Cited

OTHER PUBLICATIONS

Genovese, Angelo, Contactless and less Constrained Palmprint Recognition, Mar. 18, 2014, 48 pages.
U.S. Appl. No. 15/611,784—Response to Office Action dated Dec. 5, 2019, filed Mar. 11, 2020, 12 pages.
U.S. Appl. No. 15/611,784—Notice of Allowance dated Mar. 25, 2020, 8 pages.
PCT/US2015/032705—International Search Report dated Sep. 15, 2015, 3 pages.
PCT/US2015/032705—International Preliminary Report on Patentability dated Nov. 29, 2016, 11 pages.
U.S. Appl. No. 14/625,635—Office Action dated Oct. 11, 2017, 31 pages.
U.S. Appl. No. 14/625,635—Response to Office Action dated Oct. 11, 2017, filed Mar. 8, 2018, 17 pages.
U.S. Appl. No. 14/625,635—Office Action dated Jun. 15, 2018, 39 pages.
CN 201580041594.3—First Office Action dated Feb. 3, 2019, 29 pages.
U.S. Appl. No. 14/625,635—Office Action dated Mar. 7, 2019, 29 pages.
U.S. Appl. No. 14/625,635—Response to Office Action dated Mar. 7, 2019, filed Jul. 8, 2019, 12 pages.
U.S. Appl. No. 14/625,635—Office Action dated Feb. 21, 2020, 19 pages.
U.S. Appl. No. 14/625,635—Notice of Allowance dated May 19, 2020, 12 pages.
U.S. Appl. No. 14/625,635—Response to Office Action dated Feb. 21, 2020 filed Apr. 20, 2020, 10 pages.
Solanki, Utpal V. and Nilesh H. Desai. "Hand Gesture Based Remote Control for Home Appliances: Handmote," 2011 World Congress on Information and Communication Technologies, Mumbai, (2011), p. 419-423.
Franco, Michael. "Wave Your Hand to Control Smart Devices—Even if it's Out of Sight." Cnet (Feb. 28, 2014).
PointGrab Ltd. "New Line of Acer All-in-One Devices Among the First Products to Feature PointGrab's Windows 8 Hand Gesture Control Solution," Business Wire (English), (Nov. 13, 2012).
U.S. Appl. No. 14/625,635—Response to Office Action dated Jun. 15, 2018, filed Nov. 15, 2018, 19 pages.
U.S. Appl. No. 17/027,366—Office Action dated Sep. 30, 2021, 23 pages.
U.S. Appl. No. 17/027,366—Response to Office Action dated Sep. 30, 2021 filed Jan. 28, 2022, 16 pages.
U.S. Appl. No. 17/027,366—Final Office Action dated May 5, 2022, 11 pages.
Grauman, K., et al., "Chapter 3—Local Features: Detection and Description," Visual Object Recognition: Synthesis Lectures on Artificial Intelligence and Machine Learning, Apr. 2011, retrieved from the internet:<www.morganclaypool.com/doi/abs/10.2200/S00332Ed1V01Y201103A-M011> on Mar. 12, 2015, pp. 1, 23-39.
Wikipedia, "Affine Transformation," Wikipedia—the Free Encyclopedia, last modified Mar. 5, 2015, retrieved from the internet: <http://en.wikipedia.org/w/index.php?title=Affine.sub.--transformation-&oldid=650023248> on Mar. 12, 2015, 8 pages.
U.S. Appl. No. 14/625,635, filed Feb. 19, 2015, 10,782,657, Sep. 22, 2020, Issued.
U.S. Appl. No. 17/027,366, filed Sep. 21, 2020, US-2021-0003977-A1, Jan. 7, 2021, Published.
U.S. Appl. No. 14/658,064, filed Mar. 13, 2015, 9,679,197, Jun. 13, 2017, Issued.
U.S. Appl. No. 15/611,784, filed Jun. 2, 2017, 10,733,429, Aug. 4, 2020, Issued.
Jin et al., Vascular Tree Segmentation in Medical Images Using Hessian-Based Multiscale Filtering and Level Set Method, Hindawi, dated Jun. 28, 2013, 8 pages.

\* cited by examiner

BIOMETRIC AWARE OBJECT DETECTION AND TRACKING

PRIORITY DATA

This application is a continuation application of U.S. application Ser. No. 15/611,784, entitled "BIOMETRIC AWARE OBJECT DETECTION AND TRACKING", filed Jun. 2, 2017, which is a continuation of U.S. application Ser. No. 14/658,064, entitled "BIOMETRIC AWARE OBJECT DETECTION AND TRACKING", filed 13 Mar. 2015, which claims the benefit of U.S. Provisional Patent Application No. 61/952,843, entitled, "BIOMETRIC AWARE OBJECT DETECTION AND TRACKING", filed 13 Mar. 2014. The applications are hereby incorporated by reference for all purposes.

FIELD OF THE TECHNOLOGY DISCLOSED

The present disclosure relates generally to human machine interface and in particular to biometric identification techniques enabling object detection and tracking.

BACKGROUND

The subject matter discussed in this section should not be assumed to be prior art merely as a result of its mentioned in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

Conventional motion capture approaches rely on markers or sensors worn by the subject while executing activities and/or on the strategic placement of numerous bulky and/or complex equipment in specialized and rigid environments to capture subject movements. Unfortunately, such systems tend to be expensive to construct. In addition, markers or sensors worn by the subject can be cumbersome and interfere with the subject's natural movement. Further, systems involving large numbers of cameras tend not to operate in real time, due to the volume of data that needs to be analyzed and correlated. Still yet further, such systems are tailored to track one user's motions, would fail to discriminate between subjects when multiple subjects are present in the scene. Such considerations have limited the deployment and use of motion capture technology.

Consequently, there is a need for improved devices with more robust user discrimination techniques for capturing the motion of objects in real time without fixed or difficult to configure sensors or markers.

SUMMARY

Implementations of the technology disclosed address these and other problems by providing methods and systems for identifying users while capturing motion and/or determining the path of a portion of the user with one or more optical, acoustic or vibrational sensors. Implementations can enable use of security aware devices, e.g., automated teller machines (ATMs), cash registers and banking machines, other secure vending or service machines, security screening apparatus, secure terminals, airplanes, automobiles and so forth that comprise sensors and processors employing optical, audio or vibrational detection mechanisms suitable for providing gesture detection, personal identification, user recognition, authorization of control inputs, and other machine control and/or machine communications applications.

In one implementation, a method of authorizing commands issued by gestures is described. The method includes capturing a plurality of images of a hand in a three-dimensional (3D) sensory space, processing one or more of the images to extract biometric features of the hand, authenticating the hand based on the extracted biometric features, processing a sequence of the images as a hand gesture, determining a command indicated by the hand gesture, determining whether the authenticated hand is authorized to issue the command, and issuing an authorized command as indicated by the hand gesture.

In one implementation, the extracted biometric features include vein patterns of the hand. In another implementation, the extracted biometric features include palm prints of the hand. In yet another implementation, the extracted biometric features include fingerprints of the hand. In a further implementation, the extracted biometric features include at least one of scars of the hand, shape of the hand, size of the hand, measurements across a palm of the hand, finger width at a first knuckle of the hand, and complexion of the hand.

In some implementations, the method includes using stereo-imaging to capture the plurality of images of the hand.

In other implementations, the method includes registering multiple images of different poses of the hand during the hand gesture. In one implementation, the different poses of the hand include at least one of palm view of the hand, backhand view of the hand, and closed fist view of the hand.

In some implementations, the method also includes, responsive to authenticating the hand based on the extracted biometric features, interpreting subsequent hand gestures based on a specific interpretation criteria.

In other implementations, the method further includes issuing the authorized command to a security aware device, e.g., automated teller machines (ATMs), cash registers and banking machines, other secure vending or service machines, security screening apparatus, secure terminals, airplanes, automobiles and so forth that comprise sensors and processors employing optical, audio or vibrational detection mechanisms suitable for providing gesture detection, personal identification, user recognition, authorization of control inputs, and other machine control and/or machine communications applications.

In some implementations, processing one or more of the images to extract biometric features of the hand further includes using at least one image characteristic of the images, determining an image property that specifies changes to the image characteristic across various image points, determining variations to the image property across the various image points, and based on the determined variations, identifying points of interest in the images that represent the biometric features.

In one implementation, processing one or more of the images to extract biometric features of the hand also includes using a Hessian Matrix for determining changes to the image property across the various image points.

In another implementation, processing one or more of the images to extract biometric features of the hand also includes using eigenvalues and eigenvectors for identifying the points of interest. In one implementation, the image characteristic is pixel intensity. In another implementation, the image property is gradient of pixel intensity.

In some implementations, normalized biometric features are determined by at least one of rotating, translating, and scaling the biometric features.

In other implementations, determining whether the authenticated hand is authorized to issue the command further includes comparing the extracted biometric features to a stored biometric profile.

In one implementation, the method further includes constructing a biometric profile based on the extracted biometric features, including prompting a user to perform hand gestures in the 3D sensory space and capturing a plurality of images of the hand during the hand gestures, processing one or more of the images to extract biometric features of the hand, determining normalized biometric features by at least one of rotating, translating, and scaling the biometric features, registering multiple images of different poses of the hand during the hand gestures, and storing the normalized biometric features and corresponding poses for recognizing gestures.

In some implementations, determining whether the authenticated hand is authorized to issue the command further includes determining whether a user who performs the hand gesture has a role authorized to issue the command. In one implementation, a biometric profile is constructed at a first device and an authorized command is issued to a second device.

In other implementations, the method also includes detecting another hand gesture in the 3D sensory space, verifying hand continuity by comparing biometric features of a hand captured during the another hand gesture with biometric features of the hand captured previously, and repudiating authentication of the hand responsive to a lack of verification of the hand continuity. In one implementation, the hand gesture is at least one of an upward swiping gesture, a downward swiping gesture, a rotating gesture, and a grasping gesture.

In another implementation, a method of distinguishing control gestures from proximate non-control gestures in a virtually augmented real environment is described. The method includes detecting a set of gestures performed by different users in a virtually augmented real environment and identifying control gestures in the set of gestures that control responsiveness of one of more virtual objects superimposed over the real environment by determining a dominant user from among the users based at least on one or more biometric features of the users, and triggering a response of the virtual objects to gestures performed by the dominant user without triggering a response to gestures performed by non-dominant users.

In one implementation, the extracted biometric features include vein patterns of the hand. In another implementation, the extracted biometric features include palm prints of the hand. In yet another implementation, the extracted biometric features include fingerprints of the hand. In a further implementation, the extracted biometric features include at least one of scars of the hand, shape of the hand, size of the hand, measurements across a palm of the hand, finger width at a first knuckle of the hand, and complexion of the hand.

In some implementations, the method includes using stereo-imaging to capture the plurality of images of the hand.

In other implementations, the method includes registering multiple images of different poses of the hand during the hand gesture. In one implementation, the different poses of the hand include at least one of palm view of the hand, backhand view of the hand, and closed fist view of the hand.

In some implementations, the method also includes, responsive to authenticating the hand based on the extracted biometric features, interpreting subsequent hand gestures based on a specific interpretation criteria.

In other implementations, the method further includes issuing the authorized command to a security aware device, e.g., automated teller machines (ATMs), cash registers and banking machines, other secure vending or service machines, security screening apparatus, secure terminals, airplanes, automobiles and so forth that comprise sensors and processors employing optical, audio or vibrational detection mechanisms suitable for providing gesture detection, personal identification, user recognition, authorization of control inputs, and other machine control and/or machine communications applications.

In some implementations, processing one or more of the images to extract biometric features of the hand further includes using at least one image characteristic of the images, determining an image property that specifies changes to the image characteristic across various image points, determining variations to the image property across the various image points, and based on the determined variations, identifying points of interest in the images that represent the biometric features.

In one implementation, processing one or more of the images to extract biometric features of the hand also includes using a Hessian Matrix for determining changes to the image property across the various image points.

In another implementation, processing one or more of the images to extract biometric features of the hand also includes using eigenvalues and eigenvectors for identifying the points of interest. In one implementation, the image characteristic is pixel intensity. In another implementation, the image property is gradient of pixel intensity.

In some implementations, normalized biometric features are determined by at least one of rotating, translating, and scaling the biometric features.

In other implementations, determining whether the authenticated hand is authorized to issue the command further includes comparing the extracted biometric features to a stored biometric profile.

In one implementation, the method further includes constructing a biometric profile based on the extracted biometric features, including prompting a user to perform hand gestures in the 3D sensory space and capturing a plurality of images of the hand during the hand gestures, processing one or more of the images to extract biometric features of the hand, determining normalized biometric features by at least one of rotating, translating, and scaling the biometric features, registering multiple images of different poses of the hand during the hand gestures, and storing the normalized biometric features and corresponding poses for recognizing gestures.

In some implementations, determining whether the authenticated hand is authorized to issue the command further includes determining whether a user who performs the hand gesture has a role authorized to issue the command. In one implementation, a biometric profile is constructed at a first device and an authorized command is issued to a second device.

In other implementations, the method also includes detecting another hand gesture in the 3D sensory space, verifying hand continuity by comparing biometric features of a hand captured during the another hand gesture with biometric features of the hand captured previously, and repudiating authentication of the hand responsive to a lack of verification of the hand continuity. In one implementation, the hand gesture is at least one of an upward swiping gesture, a downward swiping gesture, a rotating gesture, and a grasping gesture.

In yet another implementation, an automated teller machine (ATM) system is described. The ATM system includes a motion-capture program executing on a processor of an automated teller machine (ATM) for capturing a plurality of images of a hand in a three-dimensional (3D) sensory space, a biometric processing module for processing one or more of the images to extract biometric features of the hand, and a command authorization module for authenticating the hand based on the extracted biometric features, including processing a sequence of the images as a hand gesture, determining a command indicated by the hand gesture, determining whether the authenticated hand is authorized to issue the command, and issuing an authorized command to the ATM as indicated by the hand gesture.

In one implementation, the authorized command controls a session manager of the ATM using a virtual object that effects transactions.

In one implementation, the extracted biometric features include vein patterns of the hand. In another implementation, the extracted biometric features include palm prints of the hand. In yet another implementation, the extracted biometric features include fingerprints of the hand. In a further implementation, the extracted biometric features include at least one of scars of the hand, shape of the hand, size of the hand, measurements across a palm of the hand, finger width at a first knuckle of the hand, and complexion of the hand.

In some implementations, stereo-imaging is used to capture the plurality of images of the hand.

In other implementations, multiple images of different poses of the hand are registered during the hand gesture. In one implementation, the different poses of the hand include at least one of palm view of the hand, backhand view of the hand, and closed fist view of the hand.

In some implementations, responsive to authenticating the hand based on the extracted biometric features, subsequent hand gestures are interpreted based on specific interpretation criteria.

In other implementations, the authorized command is issued to a security aware device, e.g., cash registers and banking machines, other secure vending or service machines, security screening apparatus, secure terminals, airplanes, automobiles and so forth that comprise sensors and processors employing optical, audio or vibrational detection mechanisms suitable for providing gesture detection, personal identification, user recognition, authorization of control inputs, and other machine control and/or machine communications applications.

In some implementations, processing one or more of the images to extract biometric features of the hand further includes using at least one image characteristic of the images, determining an image property that specifies changes to the image characteristic across various image points, determining variations to the image property across the various image points, and based on the determined variations, identifying points of interest in the images that represent the biometric features.

In one implementation, processing one or more of the images to extract biometric features of the hand also includes using a Hessian Matrix for determining changes to the image property across the various image points.

In another implementation, processing one or more of the images to extract biometric features of the hand also includes using eigenvalues and eigenvectors for identifying the points of interest. In one implementation, the image characteristic is pixel intensity. In another implementation, the image property is gradient of pixel intensity.

In some implementations, normalized biometric features are determined by at least one of rotating, translating, and scaling the biometric features.

In other implementations, determining whether the authenticated hand is authorized to issue the command further includes comparing the extracted biometric features to a stored biometric profile.

In one implementation, a biometric profile is constructed based on the extracted biometric features, including prompting a user to perform hand gestures in the 3D sensory space and capturing a plurality of images of the hand during the hand gestures, processing one or more of the images to extract biometric features of the hand, determining normalized biometric features by at least one of rotating, translating, and scaling the biometric features, registering multiple images of different poses of the hand during the hand gestures, and storing the normalized biometric features and corresponding poses for recognizing gestures.

In some implementations, determining whether the authenticated hand is authorized to issue the command further includes determining whether a user who performs the hand gesture has a role authorized to issue the command.

In one implementation, a biometric profile is constructed at a first device and an authorized command is issued to a second device.

In other implementations, another hand gesture is detected in the 3D sensory space, hand continuity is verified by comparing biometric features of a hand captured during the another hand gesture with biometric features of the hand captured previously, and authentication of the hand is repudiated responsive to a lack of verification of the hand continuity. In one implementation, the hand gesture is at least one of an upward swiping gesture, a downward swiping gesture, a rotating gesture, and a grasping gesture.

In a further implementation, a system of authorizing commands issued by gestures is described. The system includes a processor and a computer readable storage medium storing computer instructions configured to cause the processor to capture a plurality of images of a hand in a three-dimensional (3D) sensory space, process one or more of the images to extract biometric features of the hand, authenticate the hand based on the extracted biometric features, process a sequence of the images as a hand gesture, determine a command indicated by the hand gesture, determine whether the authenticated hand is authorized to issue the command, and issue an authorized command as indicated by the hand gesture.

In one implementation, the extracted biometric features include vein patterns of the hand. In another implementation, the extracted biometric features include palm prints of the hand. In yet another implementation, the extracted biometric features include fingerprints of the hand. In a further implementation, the extracted biometric features include at least one of scars of the hand, shape of the hand, size of the hand, measurements across a palm of the hand, finger width at a first knuckle of the hand, and complexion of the hand.

In some implementations, stereo-imaging is used to capture the plurality of images of the hand.

In other implementations, multiple images of different poses of the hand are registered during the hand gesture. In one implementation, the different poses of the hand include at least one of palm view of the hand, backhand view of the hand, and closed fist view of the hand.

In some implementations, responsive to authenticating the hand based on the extracted biometric features, subsequent hand gestures are interpreted based on specific interpretation criteria.

In other implementations, the authorized command is issued to a security aware device, e.g., automated teller machines (ATMs), cash registers and banking machines, other secure vending or service machines, security screening apparatus, secure terminals, airplanes, automobiles and so forth that comprise sensors and processors employing optical, audio or vibrational detection mechanisms suitable for providing gesture detection, personal identification, user recognition, authorization of control inputs, and other machine control and/or machine communications applications.

In some implementations, processing one or more of the images to extract biometric features of the hand further includes using at least one image characteristic of the images, determining an image property that specifies changes to the image characteristic across various image points, determining variations to the image property across the various image points, and based on the determined variations, identifying points of interest in the images that represent the biometric features.

In one implementation, processing one or more of the images to extract biometric features of the hand also includes using a Hessian Matrix for determining changes to the image property across the various image points.

In another implementation, processing one or more of the images to extract biometric features of the hand also includes using eigenvalues and eigenvectors for identifying the points of interest. In one implementation, the image characteristic is pixel intensity. In another implementation, the image property is gradient of pixel intensity.

In some implementations, normalized biometric features are determined by at least one of rotating, translating, and scaling the biometric features.

In other implementations, determining whether the authenticated hand is authorized to issue the command further includes comparing the extracted biometric features to a stored biometric profile.

In one implementation, a biometric profile is constructed based on the extracted biometric features, including prompting a user to perform hand gestures in the 3D sensory space and capturing a plurality of images of the hand during the hand gestures, processing one or more of the images to extract biometric features of the hand, determining normalized biometric features by at least one of rotating, translating, and scaling the biometric features, registering multiple images of different poses of the hand during the hand gestures, and storing the normalized biometric features and corresponding poses for recognizing gestures.

In some implementations, determining whether the authenticated hand is authorized to issue the command further includes determining whether a user who performs the hand gesture has a role authorized to issue the command.

In one implementation, a biometric profile is constructed at a first device and an authorized command is issued to a second device.

In other implementations, another hand gesture is detected in the 3D sensory space, hand continuity is verified by comparing biometric features of a hand captured during the another hand gesture with biometric features of the hand captured previously, and authentication of the hand is repudiated responsive to a lack of verification of the hand continuity. In one implementation, the hand gesture is at least one of an upward swiping gesture, a downward swiping gesture, a rotating gesture, and a grasping gesture.

In yet another implementation, one or more non-transitory computer readable media having instructions stored thereon for performing the method of authorizing commands issued by gestures is described. The method includes capturing a plurality of images of a hand in a three-dimensional (3D) sensory space, processing one or more of the images to extract biometric features of the hand, authenticating the hand based on the extracted biometric features, processing a sequence of the images as a hand gesture, determining a command indicated by the hand gesture, determining whether the authenticated hand is authorized to issue the command, and issuing an authorized command as indicated by the hand gesture.

In one implementation, the extracted biometric features include vein patterns of the hand. In another implementation, the extracted biometric features include palm prints of the hand. In yet another implementation, the extracted biometric features include fingerprints of the hand. In a further implementation, the extracted biometric features include at least one of scars of the hand, shape of the hand, size of the hand, measurements across a palm of the hand, finger width at a first knuckle of the hand, and complexion of the hand.

In some implementations, stereo-imaging is used to capture the plurality of images of the hand.

In other implementations, multiple images of different poses of the hand are registered during the hand gesture. In one implementation, the different poses of the hand include at least one of palm view of the hand, backhand view of the hand, and closed fist view of the hand.

In some implementations, responsive to authenticating the hand based on the extracted biometric features, subsequent hand gestures are interpreted based on specific interpretation criteria.

In other implementations, the authorized command is issued to a security aware device, e.g., automated teller machines (ATMs), cash registers and banking machines, other secure vending or service machines, security screening apparatus, secure terminals, airplanes, automobiles and so forth that comprise sensors and processors employing optical, audio or vibrational detection mechanisms suitable for providing gesture detection, personal identification, user recognition, authorization of control inputs, and other machine control and/or machine communications applications.

In some implementations, processing one or more of the images to extract biometric features of the hand further includes using at least one image characteristic of the images, determining an image property that specifies changes to the image characteristic across various image points, determining variations to the image property across the various image points, and based on the determined variations, identifying points of interest in the images that represent the biometric features.

In one implementation, processing one or more of the images to extract biometric features of the hand also includes using a Hessian Matrix for determining changes to the image property across the various image points.

In another implementation, processing one or more of the images to extract biometric features of the hand also includes using eigenvalues and eigenvectors for identifying the points of interest. In one implementation, the image characteristic is pixel intensity. In another implementation, the image property is gradient of pixel intensity.

In some implementations, normalized biometric features are determined by at least one of rotating, translating, and scaling the biometric features.

In other implementations, determining whether the authenticated hand is authorized to issue the command further includes comparing the extracted biometric features to a stored biometric profile.

In one implementation, a biometric profile is constructed based on the extracted biometric features, including prompting a user to perform hand gestures in the 3D sensory space and capturing a plurality of images of the hand during the hand gestures, processing one or more of the images to extract biometric features of the hand, determining normalized biometric features by at least one of rotating, translating, and scaling the biometric features, registering multiple images of different poses of the hand during the hand gestures, and storing the normalized biometric features and corresponding poses for recognizing gestures.

In some implementations, determining whether the authenticated hand is authorized to issue the command further includes determining whether a user who performs the hand gesture has a role authorized to issue the command.

In one implementation, a biometric profile is constructed at a first device and an authorized command is issued to a second device.

In other implementations, another hand gesture is detected in the 3D sensory space, hand continuity is verified by comparing biometric features of a hand captured during the another hand gesture with biometric features of the hand captured previously, and authentication of the hand is repudiated responsive to a lack of verification of the hand continuity. In one implementation, the hand gesture is at least one of an upward swiping gesture, a downward swiping gesture, a rotating gesture, and a grasping gesture.

In a further implementation, a system of distinguishing control gestures from proximate non-control gestures in a virtually augmented real environment is described. The system includes a processor and a computer readable storage medium storing computer instructions configured to cause the processor to detect a set of gestures performed by different users in a virtually augmented real environment and identify control gestures in the set of gestures that control responsiveness of one or more virtual objects superimposed over the real environment by determining a dominant user from among the users based at least on one or more biometric features of the users, and triggering a response of the virtual objects to gestures performed by the dominant user without triggering a response to gestures performed by non-dominant users.

In one implementation, the extracted biometric features include vein patterns of the hand. In another implementation, the extracted biometric features include palm prints of the hand. In yet another implementation, the extracted biometric features include fingerprints of the hand. In a further implementation, the extracted biometric features include at least one of scars of the hand, shape of the hand, size of the hand, measurements across a palm of the hand, finger width at a first knuckle of the hand, and complexion of the hand.

In some implementations, stereo-imaging is used to capture the plurality of images of the hand.

In other implementations, multiple images of different poses of the hand are registered during the hand gesture. In one implementation, the different poses of the hand include at least one of palm view of the hand, backhand view of the hand, and closed fist view of the hand.

In some implementations, responsive to authenticating the hand based on the extracted biometric features, subsequent hand gestures are interpreted based on specific interpretation criteria.

In other implementations, the authorized command is issued to a security aware device, e.g., automated teller machines (ATMs), cash registers and banking machines, other secure vending or service machines, security screening apparatus, secure terminals, airplanes, automobiles and so forth that comprise sensors and processors employing optical, audio or vibrational detection mechanisms suitable for providing gesture detection, personal identification, user recognition, authorization of control inputs, and other machine control and/or machine communications applications.

In some implementations, processing one or more of the images to extract biometric features of the hand further includes using at least one image characteristic of the images, determining an image property that specifies changes to the image characteristic across various image points, determining variations to the image property across the various image points, and based on the determined variations, identifying points of interest in the images that represent the biometric features.

In one implementation, processing one or more of the images to extract biometric features of the hand also includes using a Hessian Matrix for determining changes to the image property across the various image points.

In another implementation, processing one or more of the images to extract biometric features of the hand also includes using eigenvalues and eigenvectors for identifying the points of interest. In one implementation, the image characteristic is pixel intensity. In another implementation, the image property is gradient of pixel intensity.

In some implementations, normalized biometric features are determined by at least one of rotating, translating, and scaling the biometric features.

In other implementations, determining whether the authenticated hand is authorized to issue the command further includes comparing the extracted biometric features to a stored biometric profile.

In one implementation, a biometric profile is constructed based on the extracted biometric features, including prompting a user to perform hand gestures in the 3D sensory space and capturing a plurality of images of the hand during the hand gestures, processing one or more of the images to extract biometric features of the hand, determining normalized biometric features by at least one of rotating, translating, and scaling the biometric features, registering multiple images of different poses of the hand during the hand gestures, and storing the normalized biometric features and corresponding poses for recognizing gestures.

In some implementations, determining whether the authenticated hand is authorized to issue the command further includes determining whether a user who performs the hand gesture has a role authorized to issue the command.

In one implementation, a biometric profile is constructed at a first device and an authorized command is issued to a second device.

In other implementations, another hand gesture is detected in the 3D sensory space, hand continuity is verified by comparing biometric features of a hand captured during the another hand gesture with biometric features of the hand captured previously, and authentication of the hand is repudiated responsive to a lack of verification of the hand continuity. In one implementation, the hand gesture is at least one of an upward swiping gesture, a downward swiping gesture, a rotating gesture, and a grasping gesture.

One or more non-transitory computer readable media having instructions stored thereon for performing the method of distinguishing control gestures from proximate non-control gestures in a virtually augmented real environment is described. The method includes detecting a set of gestures performed by different users in a virtually augmented real environment and identifying control gestures in the set of gestures that control responsiveness of one of more virtual objects superimposed over the real environment by determining a dominant user from among the users based at least on one or more biometric features of the users, and triggering a response of the virtual objects to gestures performed by the dominant user without triggering a response to gestures performed by non-dominant users.

In one implementation, the extracted biometric features include vein patterns of the hand. In another implementation, the extracted biometric features include palm prints of the hand. In yet another implementation, the extracted biometric features include fingerprints of the hand. In a further implementation, the extracted biometric features include at least one of scars of the hand, shape of the hand, size of the hand, measurements across a palm of the hand, finger width at a first knuckle of the hand, and complexion of the hand.

In some implementations, stereo-imaging is used to capture the plurality of images of the hand.

In other implementations, multiple images of different poses of the hand are registered during the hand gesture. In one implementation, the different poses of the hand include at least one of palm view of the hand, backhand view of the hand, and closed fist view of the hand.

In some implementations, responsive to authenticating the hand based on the extracted biometric features, subsequent hand gestures are interpreted based on specific interpretation criteria.

In other implementations, the authorized command is issued to a security aware device, e.g., automated teller machines (ATMs), cash registers and banking machines, other secure vending or service machines, security screening apparatus, secure terminals, airplanes, automobiles and so forth that comprise sensors and processors employing optical, audio or vibrational detection mechanisms suitable for providing gesture detection, personal identification, user recognition, authorization of control inputs, and other machine control and/or machine communications applications.

In some implementations, processing one or more of the images to extract biometric features of the hand further includes using at least one image characteristic of the images, determining an image property that specifies changes to the image characteristic across various image points, determining variations to the image property across the various image points, and based on the determined variations, identifying points of interest in the images that represent the biometric features.

In one implementation, processing one or more of the images to extract biometric features of the hand also includes using a Hessian Matrix for determining changes to the image property across the various image points.

In another implementation, processing one or more of the images to extract biometric features of the hand also includes using eigenvalues and eigenvectors for identifying the points of interest. In one implementation, the image characteristic is pixel intensity. In another implementation, the image property is gradient of pixel intensity.

In some implementations, normalized biometric features are determined by at least one of rotating, translating, and scaling the biometric features.

In other implementations, determining whether the authenticated hand is authorized to issue the command further includes comparing the extracted biometric features to a stored biometric profile.

In one implementation, a biometric profile is constructed based on the extracted biometric features, including prompting a user to perform hand gestures in the 3D sensory space and capturing a plurality of images of the hand during the hand gestures, processing one or more of the images to extract biometric features of the hand, determining normalized biometric features by at least one of rotating, translating, and scaling the biometric features, registering multiple images of different poses of the hand during the hand gestures, and storing the normalized biometric features and corresponding poses for recognizing gestures.

In some implementations, determining whether the authenticated hand is authorized to issue the command further includes determining whether a user who performs the hand gesture has a role authorized to issue the command.

In one implementation, a biometric profile is constructed at a first device and an authorized command is issued to a second device.

In other implementations, another hand gesture is detected in the 3D sensory space, hand continuity is verified by comparing biometric features of a hand captured during the another hand gesture with biometric features of the hand captured previously, and authentication of the hand is repudiated responsive to a lack of verification of the hand continuity. In one implementation, the hand gesture is at least one of an upward swiping gesture, a downward swiping gesture, a rotating gesture, and a grasping gesture.

In one implementation, a method of authenticating a user of a sensory machine control system includes capturing sensory information for a human body portion within a field of interest. A tracking model and biometric model are determined from the sensory information. A command is determined from recognizing a gesture indicated by variation in the tracking model over time and the biometric model is compared to known users' biometric information. When the biometric model corresponds to biometric information of a known user, an authorized command is communicated to a system under control. Authorized commands enable users to login to machines and/or systems, to effect transactions, invoke features/functionality, and/or exchange information.

A biometric model can be determined by analyzing image(s) to determine an image characteristic (e.g., intensity, brightness, color, other characteristics, combinations thereof) and determining a property (e.g., rate of change, maximal, minimal, average or other statistical properties, combinations thereof, and so forth) for the image characteristic. The property can be analyzed to determine changes in the property indicating biometric features corresponding to points of interest in the image. For example, a Hessian can be computed for points in the image, the Hessian indicating how the brightness (or other characteristic) is changing. The biometric features can be transformed based at least in part upon orientation/rotation/translation information to form normalized biometric features. A biometric profile set can be built from one or more identified biometric features; and a biometric model built for an individual from one or more biometric profile set(s).

Additional commands, if any, can be verified by recognizing a second gesture indicated by variation in the tracking model and comparing biometric information of the hand captured during the second gesture with biometric information of the hand captured previously to verify continuity; e.g., determine that the user has not changed. In the event that the biometric information of the hand captured during the second gesture does not correspond to biometric information of the hand captured previously, command information associated with the second gesture can be discarded.

Commands authorization can include determining from profile information stored for the known users, whether an authenticated user having the biometric profile is in a role (e.g., system administrator, developer, manager, and so forth) authorized to issue the command determined from tracking the user's hand (or other body) activity. If the user is determined to be authorized to issue the command based at least in part upon the role, the authorized command is communicated to a system being controlled.

In another aspect, a method of authenticating a user of a sensory machine control system includes receiving a plurality of images of a body portion of the user. A hessian of the images can be determined to find biometric identifiers. One or more poses of body portion can be extracted from the images. Pairings of biometric identifiers and at least one pose of the body portion can be formed. Normal vectors and performing principle component analysis (PCA) can be determined to find implicit orientation. One or more biometric identifier(s) can be transformed according to the orientation to form normalized identifier(s). A database of authorizations can be queried for identifiers corresponding to normalized identifiers, returning authorization information corresponding to identifiers.

In a yet further aspect, an automated teller machine system includes a sensory system to capture sensory information of a body portion within a field of interest and a control module to authenticate a user based at least in part upon a body portion, in response to the capture of sensory information by the sensory system. The control module, capable of: determining from the sensory information a tracking model and a biometric model; determining a command from recognizing a gesture indicated by variation in the tracking model over time; comparing the biometric model to known users' biometric information; and communicating an authorized command to a system under control when the biometric model corresponds to biometric information of a known user.

Advantageously, some implementations can enable authorized commands to be issued responsive to gesture recognition for use in ATMs or other devices based upon authorized use. This capability allows the user to "self-authenticate" while executing intuitive gestures to command a device. Implementations can enable gesture detection, user identification, user authorization, and other machine control and/or machine communications applications in a wide variety of devices, e.g., automated teller machines (ATMs), cash registers and banking machines, other secure vending or service machines, security screening apparatus, secure terminals, airplanes, automobiles and so forth; wired or wirelessly coupled networks of one or more of the foregoing, and/or combinations thereof that comprise sensors and processors employing optical, audio or vibrational detection mechanisms suitable for providing gesture detection, personal identification, user recognition, authorization of control inputs, and other machine control and/or machine communications applications, obviating or reducing the need for contact-based input devices such as a mouse, joystick, touch pad, or touch screen. Some implementations can provide for improved interface with computing and/or other machinery than would be possible with heretofore known techniques.

In some implementations, a richer human—machine interface experience can be provided.

Other aspects and advantages of the present technology can be seen on review of the drawings, the detailed description and the claims, which follow.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the disclosed technology. In the following description, various implementations of the technology disclosed are described with reference to the following drawings, in which.

DETAILED DESCRIPTION

Figure 1:
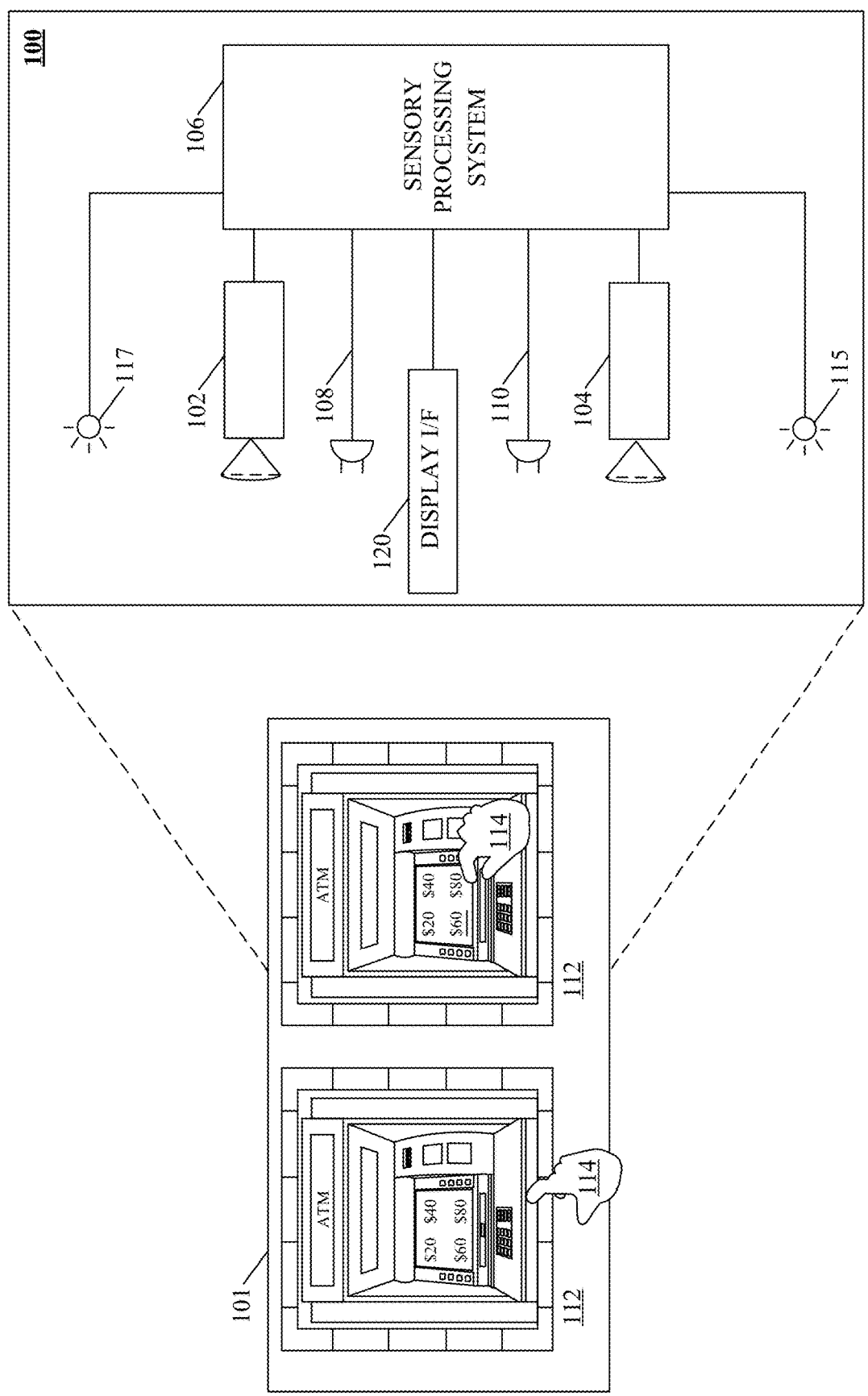
FIG. 1 illustrates a system for capturing image and other sensory data according to an implementation of the technology disclosed.

Among other aspects, the technology described herein with reference to example implementations can provide for automatically (e.g., programmatically) identifying users while capturing motion and/or path information indicating a gesture using one or more sensors configured to capture motion and biometric information. The sensor can determine the path of an object based on any or various combinations of imaging, acoustic or vibrational waves. Implementations can enable gesture detection, user identification, user authorization, and other machine control and/or machine communications applications in a wide variety of devices, e.g., automated teller machines (ATMs), cash registers and banking machines, other secure vending or service machines, security screening apparatus, secure terminals, airplanes, automobiles and so forth; wired or wirelessly coupled networks of one or more of the foregoing, and/or combinations thereof, that comprise sensors and processors employing optical, audio or vibrational detection mechanisms suitable for providing gesture detection, personal identification, user recognition, authorization of control inputs, and other machine control and/or machine communications applications.

In some implementations, motion sensors and/or other types of sensors can be coupled to a motion-capture system to monitor user biometric information and hand motions within a real environment. Biometric information determined from a user's hand (e.g., vein patterns, palm prints, fingerprints, etc.), or other body portion, can be obtained from sensory information received from imaging (or acoustic or other sensory) devices. Biometric information can be used to determine whether the user is authorized to issue certain commands based in part on comparison of detected features of the user's body and stored features for authorized users. When authorized, the user's gestures can be transformed to authorized command information to be communicated to a system under control. Role information (e.g., system administrator, developer, manager, CEO, and so forth) for the user stored along with biometric information of known users, enables discrimination of user authorization at the command level, i.e., individual commands can be authorized—or blocked—for users based upon the user's role.

Some implementations include projection techniques to supplement the sensory based tracking with presentation of virtual (or virtualized i.e., visual, audio, haptic, and so forth, real objects) to provide a user of the device with a personal interaction experience. Projection can include an image or other visual representation of the user's hand (or other body portion) superimposed on other screen objects of interest.

Optical image sensing can detect biometric and tracking information for portions of users. For example, a sequence of images can be correlated to construct a 3D model of the user's hand(s), including its position and shape. A succession of images can be analyzed using the same technique to model motion of the body portion such as free-form gestures. See also, e.g., U.S. patent application Ser. No. 13/414,485 (filed on Mar. 7, 2012) and U.S. Provisional Patent Application Nos. 61/724,091 (filed on Nov. 8, 2012) and 61/587,554 (filed on Jan. 7, 2012), the entire disclosures of which are hereby incorporated by reference. In low-light or other situations not conducive to optical imaging, where free-form gestures cannot be recognized optically with a sufficient degree of reliability, audio signals or vibrational waves can be detected and used to supply the direction and location of the body portion as further described herein. See also, e.g., U.S. patent application Ser. No. 14/149,709 (filed on Jan. 7, 2014) and U.S. Provisional Patent Application No. 61/927,919 (filed on Jan. 15, 2014).

Refer first to FIG. 1, which illustrates a system 100 for capturing image data according to one implementation of the technology disclosed. System 100 is preferably coupled to a device 101 that can be an automated teller machine (ATM) for example, having any of a variety of form factors such as the example shown in FIG. 1, security screening apparatus, cash registers and banking machines, or other types of devices for which authorization and/or identification of users is desirable. Device 101 can comprise an embedded (or coupled) system 100 having one or more cameras 102, 104 coupled to sensory processing system 106. In the event that more than one camera 102, 104 captures images of region of interest 112, any of a variety of stereo-imaging techniques can be employed to obtain scene information from the images. Cameras 102, 104 can be any type of camera, including cameras sensitive across the visible spectrum or with enhanced sensitivity to a confined wavelength band (e.g., the infrared (IR) or ultraviolet bands); more generally, the term "camera" herein refers to any device (or combination of devices) capable of capturing an image of an object and representing that image in the form of digital data. For example, line sensors or line cameras rather than conventional devices that capture a two-dimensional (2D) image can be employed. The term "light" is used generally to connote any electromagnetic radiation, which may or may not be within the visible spectrum, and may be broadband (e.g., white light) or narrowband (e.g., a single wavelength or narrow band of wavelengths).

Cameras 102, 104 are preferably capable of capturing video images (i.e., successive image frames at a constant rate of at least 15 frames per second), although no particular frame rate is required. The capabilities of cameras 102, 104 are not critical to the technology disclosed, and the cameras can vary as to frame rate, image resolution (e.g., pixels per image), color or intensity resolution (e.g., number of bits of intensity data per pixel), focal length of lenses, depth of field, etc. In general, for a particular application, any cameras capable of focusing on objects within a spatial volume of interest can be used. For instance, to capture motion of the hand of an otherwise stationary person, the volume of interest might be defined as a cube approximately one meter on a side. Capturing motion of a whole body might include a cube of approximately the size of a room in which the user is being viewed.

As shown, cameras 102, 104 can be oriented toward portions of a region of interest 112 relative to the device 101, in order to view the region of interest 112 that can contain a body portion of interest, in this example one or more hands 114, that move within the region of interest 112. One or more sensors 108, 110 capture biometric characteristics for the hand(s) 114—or rest of the user—in conjunction with the images captured by the cameras 102, 104. In some implementations, one or more light sources 115, 117 are arranged to illuminate the region of interest 112. In some implementations, one or more of the cameras 102, 104 are disposed opposite the motion to be detected, e.g., where the hand 114 is expected to move. This is an optimal location because the amount of information recorded about the hand is proportional to the number of pixels it occupies in the camera images, and the hand will occupy more pixels when the camera's angle with respect to the hand's "pointing direction" is as close to perpendicular as possible. Sensory processing system 106, which can be, e.g., a computer system, can control the operation of cameras 102, 104 to capture images of the region of interest 112 and sensors 108, 110 to capture biometric identification characteristics (e.g., pulse, heartbeat, body temperature, etc.) from the hand 114. Information from sensors 108, 110 can be applied to model(s) determined using images taken by cameras 102, 104 to augment information from cameras 102, 104, providing greater scope to the information captured by sensor 100. Based on the captured images and other sensory information, sensory processing system 106 determines the position and/or motion for the hand 114 and gathers biometric identification information from the hand 114.

For example, as an action in determining position, motion or other characteristics of hand 114, sensory processing system 106 can determine which pixels of various images captured by cameras 102, 104 contain portions of hand 114. In some implementations, any pixel in an image can be classified as an "object" pixel or a "background" pixel depending on whether that pixel contains a portion of hand 114 or not. Object pixels can thus be readily distinguished from background pixels based on brightness. Further, edges of the object can also be readily detected based on differences in brightness between adjacent pixels, allowing the position of the object within each image to be determined. In some implementations, the surface portions of an object are extracted from one or more images of the object that reveal information about the object as seen from different vantage points. While surface portions can be obtained using a number of different techniques, in some implementations, the surface portions are obtained by using cameras to capture images of the object and analyzing the images to detect object edges. Correlating object positions between images from cameras 102, 104 allows sensory processing system 106 to determine the location in 3D space of hand 114, and analyzing sequences of images allows sensory processing system 106 to reconstruct 3D motion of hand 114 using motion algorithms or other techniques. Such reconstructions can be used to build a 3D model of the hand 114 from which command information can be determined. See, e.g., U.S. patent application Ser. No. 13/414,485 (filed on Mar. 7, 2012) and U.S. Provisional Patent Application Nos. 61/724,091 (filed on Nov. 8, 2012) and 61/587,554 (filed on Jan. 7, 2012), the entire disclosures of which are incorporated by reference above. Biometric characteristics can be reflected in a biometric model, enabling the system to identify specific users based upon a model built from information about the user's hand.

Presentation interface 120 employs projection techniques in conjunction with the sensory based tracking in order to present virtual (or virtualized real) objects (visual, audio, haptic, and so forth) to provide a user of the device with a personal interaction experience. Projection can include an image or other visual representation of the user's hand (or other body portion) superimposed on other screen objects of interest.

Figure 8:
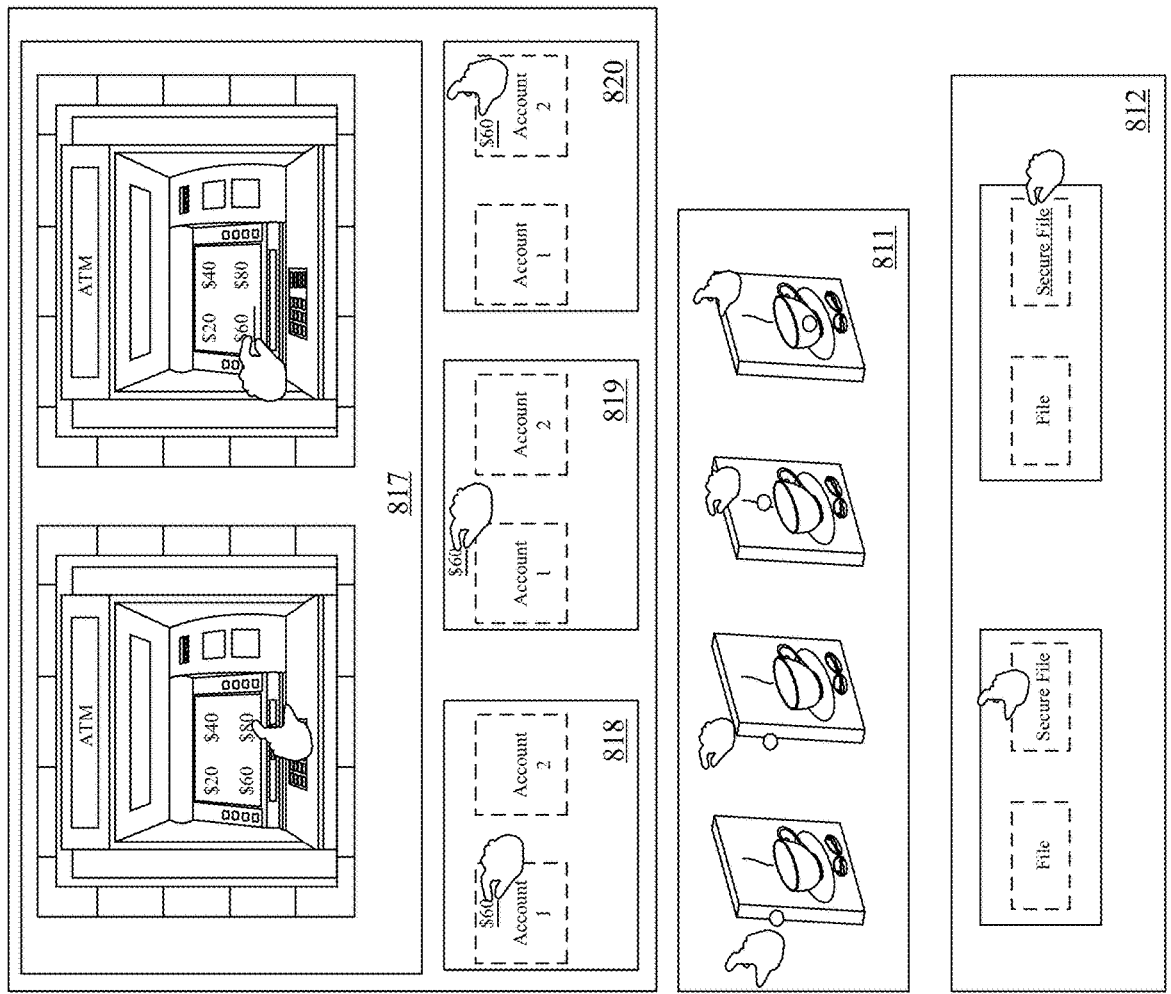
FIG. 8 illustrates an environment provided for the user of a biometric sensory enabled apparatus in accordance with the technology disclosed.
Figure 8:
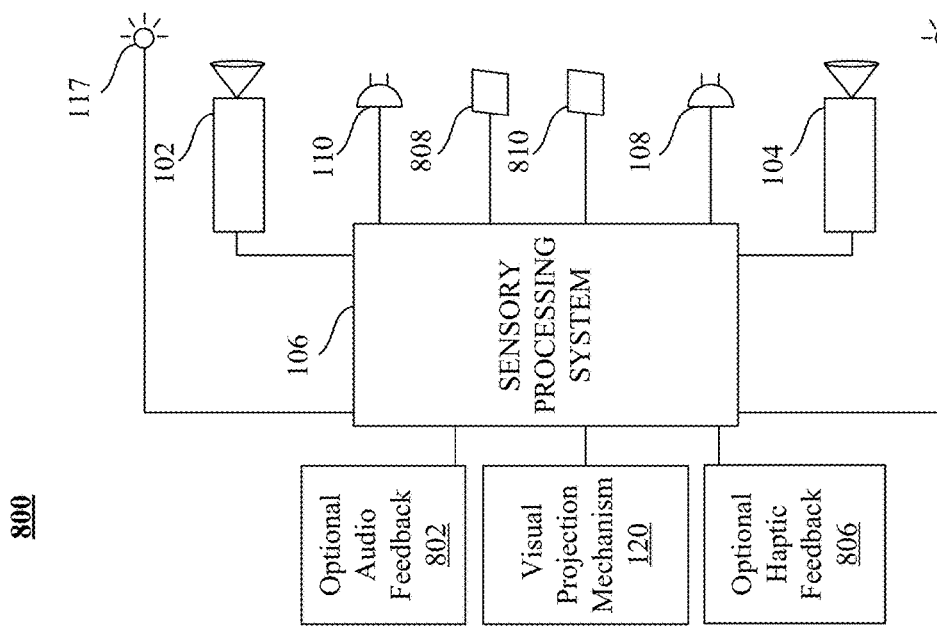

One implementation provides a personal interaction experience by integrating virtual object(s) into an augmented rendering of a real environment that can be projected to the user of device 101. For example, with reference to FIG. 8, an image of a hand can be superimposed optionally with a transactional amount and projected relative to one or more accounts to indicate transaction(s) involving the accounts (e.g., screenshots 808-810) or a superimposed hand manipulating a virtual sugar object and adding it to a virtual coffee object to effect a command of ordering a coffee with sugar (e.g., screenshot 811) or a hand superimposed over one or more file objects (or other objects representing objects defined within a computing system) to select a particular object for interaction (e.g., screenshot 812). Optionally, the personal interaction experience can be augmented by the addition of haptic, audio and/or other sensory information projectors. For example, haptic projector 806 can project the feeling of the texture of "grasping" the virtual sugar cube to the reader's finger. Optional audio projector 802 can project the sound of the virtual sugar cube dropping into the coffee in response to detecting the user making a request to drop the sugar cube into the coffee.

A plurality of auxiliary biometric sensors 108, 110 can be coupled to the sensory processing system 106 to capture biometric information of a user of the device 101. Sensors 108, 110 can be any type of sensor useful for obtaining signals from properties underpinning various biometric identification characteristics (e.g., pulse, heartbeat, body temperature, respiratory rate, etc.); more generally, the term "biometric sensor" herein refers to any device (or combination of devices) capable of converting mechanical or physical properties into an electrical signal. Such devices can include, alone or in various combinations, thermometers, respiratory detectors, electrocardiogram (EKG) and other heart monitors, electroencephalogram (EEG) and other brain activity monitors, microphones and other sensors for collecting voice print information, specialized apparatus for performing iris or retinal scans of the user's eyes, accelerometers, gyroscopes, and magnetometers, and the like that are designed to sense differences in user body parameters through changes in physical properties. Many types of biometric sensors exist and implementation alternatives vary widely.

The illustrated system 100 can include any of various other sensors not shown in FIG. 1 for clarity, alone or in various combinations, to enhance the personal interaction experience provided to the user of device 101. For example, in low-light situations where free-form gestures cannot be recognized optically with a sufficient degree of reliability, system 106 may switch to a touch mode in which touch gestures are recognized based on acoustic or vibrational sensors. Alternatively, system 106 may switch to the touch mode, or supplement image capture and processing with touch sensing, when signals from acoustic, vibrational or presence sensors are sensed. In still another operational mode, a tap or touch gesture may act as a "wake up" signal to bring the sensory processing system 106 from a standby mode to an operational mode. For example, the system 106 may enter the standby mode if optical signals from the cameras 102, 104 are absent (or relatively invariant or otherwise uninteresting) for longer than a threshold interval.

It will be appreciated that the figures shown in FIG. 1 are illustrative. In some implementations, it may be desirable to house the system 100 in a differently shaped enclosure or integrated within a larger component or assembly. Furthermore, the number and type of image sensors, biometric sensors, illumination sources, and so forth are shown schematically for the clarity, but neither the size nor the number is the same in all implementations.

Figure 2:
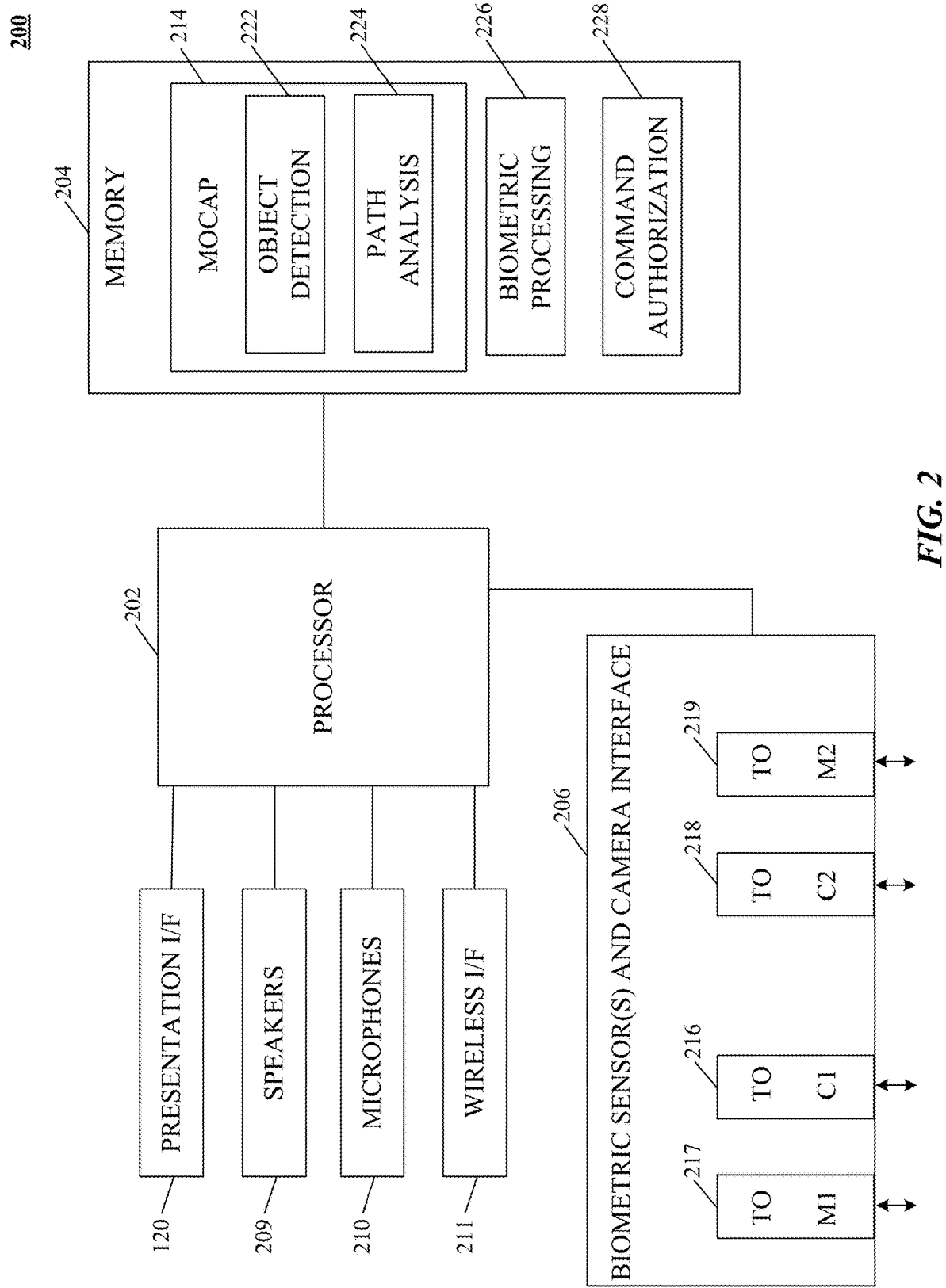
FIG. 2 is a simplified block diagram of a computer system implementing image analysis suitable for supporting a virtual environment enabled apparatus according to an implementation of the technology disclosed.

Refer now to FIG. 2, which shows a simplified block diagram of a computer system 200 for implementing sensory processing system 106. Computer system 200 includes a processor 202, a memory 204, a biometric sensor(s) and camera interface 206, a presentation interface 120, speaker(s) 209, a microphone(s) 210, and a wireless interface 211. Memory 204 can be used to store instructions to be executed by processor 202 as well as input and/or output data associated with execution of the instructions. In particular, memory 204 contains instructions, conceptually illustrated as a group of modules described in greater detail below, that control the operation of processor 202 and its interaction with the other hardware components. An operating system directs the execution of low-level, basic system functions such as memory allocation, file management and operation of mass storage devices. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENACTION operating system, iOS, Android or other mobile operating systems, or another operating system of platform.

The computing environment may also include other removable/non-removable, volatile/nonvolatile computer storage media. For example, a hard disk drive may read or write to non-removable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

Processor 202 may be a general-purpose microprocessor, but depending on implementation can alternatively be a microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), a PLD (programmable logic device), a PLA (programmable logic array), an RFID processor, smart chip, or any other device or arrangement of devices that is capable of implementing the actions of the processes of the technology disclosed.

Biometric sensor(s) and camera interface 206 can include hardware and/or software that enables communication between computer system 200 and cameras 102, 104, as well as sensors 108, 110 (see FIG. 1). Thus, for example, biometric sensor(s) and camera interface 206 can include one or more camera data ports 216, 218 and motion detector ports 217, 219 to which the cameras and motion detectors can be connected (via conventional plugs and jacks), as well as hardware and/or software signal processors to modify data signals received from the cameras and biometric sensor(s) (e.g., to reduce noise or reformat data) prior to providing the signals as inputs to a motion-capture ("mocap") program 214 executing on processor 202. In some implementations, biometric sensor(s) and camera interface 206 can also transmit signals to the cameras and sensors, e.g., to activate or deactivate them, to control camera settings (frame rate, image quality, sensitivity, etc.), to control sensor settings (calibration, sensitivity levels, etc.), or the like. Such signals can be transmitted, e.g., in response to control signals from processor 202, which may in turn be generated in response to user input or other detected events.

Instructions defining mocap program 214 are stored in memory 204, and these instructions, when executed, perform motion-capture analysis on images supplied from cameras and other signals representing data from sensors connected to biometric sensor(s) and camera interface 206. In one implementation, mocap program 214 includes various modules, such as an object analysis module 222 and a path analysis module 224. Object analysis module 222 can analyze images (e.g., images captured via interface 206) to detect edges of an object therein and/or other information about the object's location. In some implementations, object analysis module 222 can also analyze audio or vibrational signals (e.g., audio signals captured via interface 206) to localize the object by, for example, time distance of arrival, multilateration or the like. ("Multilateration is a navigation technique based on the measurement of the difference in distance to two or more stations at known locations that broadcast signals at known times. See Wikipedia, at http://en.wikipedia.org/w/index.php?title=Multilateration&oldid=523281858, on Nov. 16, 2012, 06:07 UTC). Path analysis module 224 can track and predict object movements in 3D based on information obtained via the cameras 102, 104.

Some implementations will include a biometric processing engine 226 that provides integration of biometric information (e.g., identifying information gathered from hand 114, identifying information gathered from other types of sensors 108, 110) for authorization of a user of device 101. For example, biometric processing engine 226 determines biometric characteristics (vein patterns, palm prints, fingerprints, hand shape, size, identifying features such as scars, complexion, and so forth) discerned from hand 114 (or other body portion) from one or more image(s) obtained from cameras 102, 104. A command authorization engine 228 determines an identity of the user from the biometric characteristics. The command authorization engine 228 can further determine whether a command indicated by a gesture determined by path analysis 224 can be authorized based upon the identity of the user, a set of access permissions of the user, and a set of permissions—or a role—required to perform the command. Accordingly, biometric processing engine 226 and command authorization engine 228 can be loaded into memory 204 (or otherwise made available to processor 202) to enable the user to obtain access to the authorized functionality of device 101. Successive camera images are analyzed at the pixel level to extract object movements and velocities. In some implementations, audio signals can be captured and processed, enabling the user to be identified by voice prints, speech patterns, spoken passwords, and so forth. If both audio and image information is simultaneously available, both types of information can be analyzed and reconciled to produce a more detailed and/or accurate analysis of the user's identity and command input.

Presentation interface 120, speakers 209, microphones 210, and wireless network interface 211 can enable computer system 200 to facilitate user interaction with device 101. These components can be of generally conventional design or modified to provide any type of user interaction desired. In some implementations, results of motion capture using biometric sensor(s) and camera interface 206 and mocap program 214 can be interpreted as user input. For example, a user can perform hand gestures or motions that are analyzed using mocap program 214, and the results of this analysis can be interpreted as an instruction to some other program executing on processor 200 (e.g., session manager for an ATM, a web browser, word processor, or other application). Thus, by way of illustration, a user might use upward or downward swiping gestures to "scroll" a page currently displayed to the user of device 101 via presentation interface 120, to use rotating gestures to increase or decrease the volume of audio output from speakers 209, and so on. Path analysis module 224 may represent the detected path as a vector and extrapolate to predict the path, e.g., to improve rendering of action on device 101 by presentation interface 120 by anticipating movement. Thus, for example, execution of object analysis module 222 by processor 202 can cause processor 202 to operate biometric sensor(s) and camera interface 206 to capture images and/or other sensory signals of a body portion traveling in region of interest 112 to detect its entrance by analyzing the image and/or other sensory data.

It will be appreciated that computer system 200 is illustrative and that variations and modifications are possible. Computer systems can be implemented in a variety of form factors, including server systems, desktop systems, laptop systems, tablets, smart phones or personal digital assistants, and so on. A particular implementation may include other functionality not described herein, e.g., wired and/or wireless network interfaces, media playing and/or recording capability, etc. In some implementations, one or more cameras and two or more microphones may be built into the computer rather than being supplied as separate components. Further, an image or audio analyzer can be implemented using only a subset of computer system components (e.g., as a processor executing program code, an ASIC, or a fixed-function digital signal processor, with suitable I/O interfaces to receive image data and output analysis results).

While computer system 200 is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components (e.g., for data communication) can be wired and/or wireless as desired.

Figure 3A:
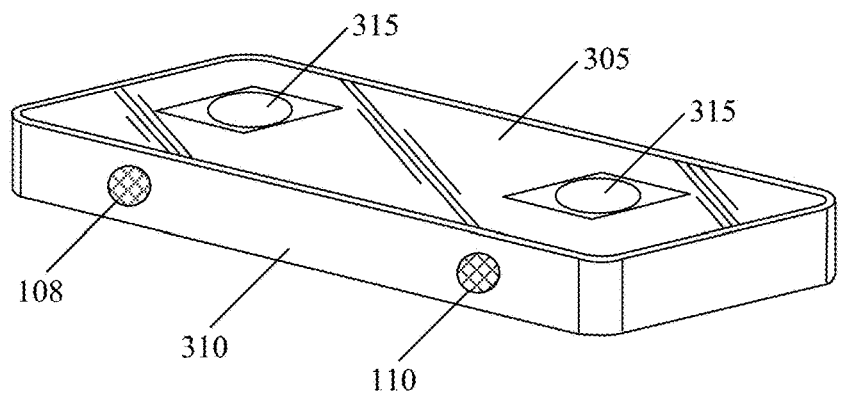
FIG. 3A is a perspective view from the top of a sensor in accordance with the technology disclosed, with motion sensors along an edge surface thereof.
Figure 3B:
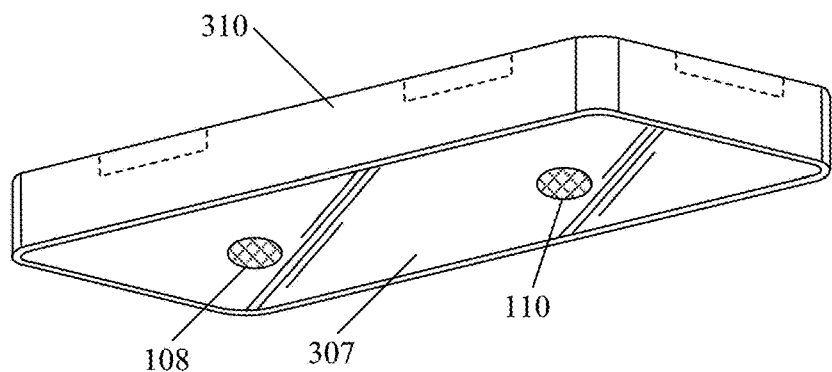
FIG. 3B is a perspective view from the bottom of a sensor in accordance with the technology disclosed, with motion sensors along the bottom surface thereof.
Figure 3C:
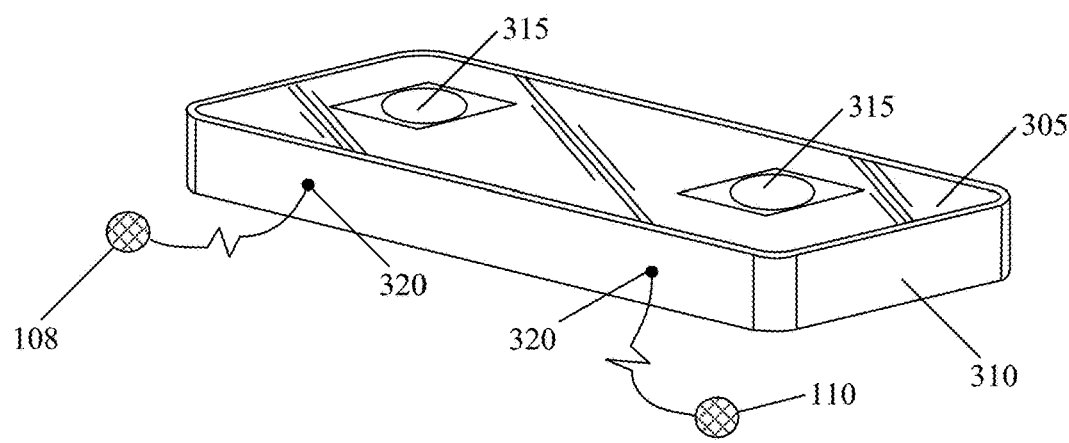
FIG. 3C is a perspective view from the top of a sensor in accordance with the technology disclosed, with detachable motion sensors configured for placement on a surface.

FIGS. 3A-3C illustrate three different configurations of a sensor system 300, with reference to example implementations packaged within a single housing as an integrated sensor. In the illustrated cases, sensor 300A, 300B, 300C includes a top surface 305, a bottom surface 307, and a side wall 310 spanning the top and bottom surfaces 305, 307. With reference also to FIG. 3A, the top surface 305 of sensor 300A contains a pair of windows 315 for admitting light to the cameras 102, 104, one of which is optically aligned with each of the windows 315. If the system includes light sources 115, 117, surface 305 may contain additional windows for passing light to the object(s) being tracked. In sensor 300A, biometric sensors 108, 110 are located on the side wall 310 and directed to the user of device 101. Accordingly, sensor 300A is configured to observe hand 114 from below region of interest 112. In sensor 300B, biometric sensors 108, 110 are located proximate to the bottom surface 307, once again in a flush or recessed configuration. The bottom surface of the sensor 300B (not shown in the figure for clarity sake) contains camera windows 315 as shown in FIG. 3A. In FIG. 3C, biometric sensors 108, 110 are external biometric sensors that connect to sensor 300C via jacks 320. This configuration permits the biometric sensors to be located away from the sensor 300C, e.g., if the biometric sensors are desirably spaced further apart than the packaging of sensor 300C allows. In other implementations, external sensor components of FIG. 3 can be imbedded in security aware devices (e.g., automated teller machines (ATMs), cash registers and banking machines, other secure vending or service machines, security screening apparatus, secure terminals, airplanes, automobiles and so forth).

Figure 4:
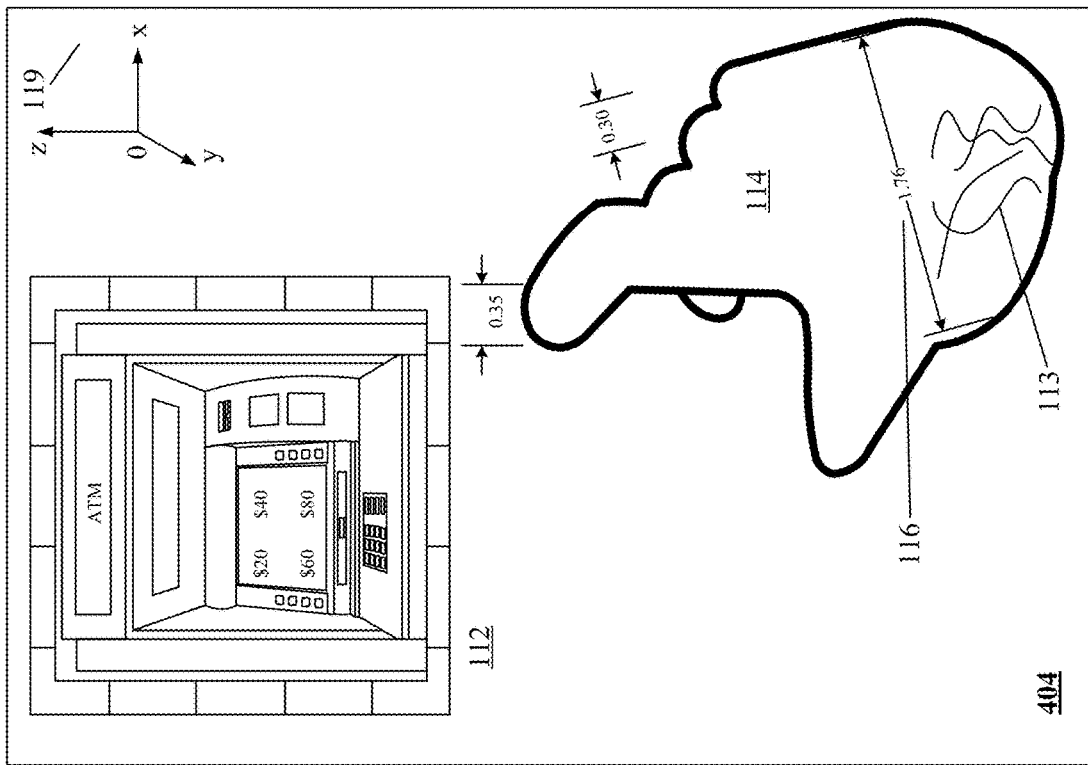
FIG. 4 illustrates training a sensor equipped device to recognize a user by biometric features identified from a portion of the user's body and recognizing the user by comparing a biometric profile set built from the user's biometric features with previously recognized biometric features of the user in accordance with the technology disclosed.
Figure 4:
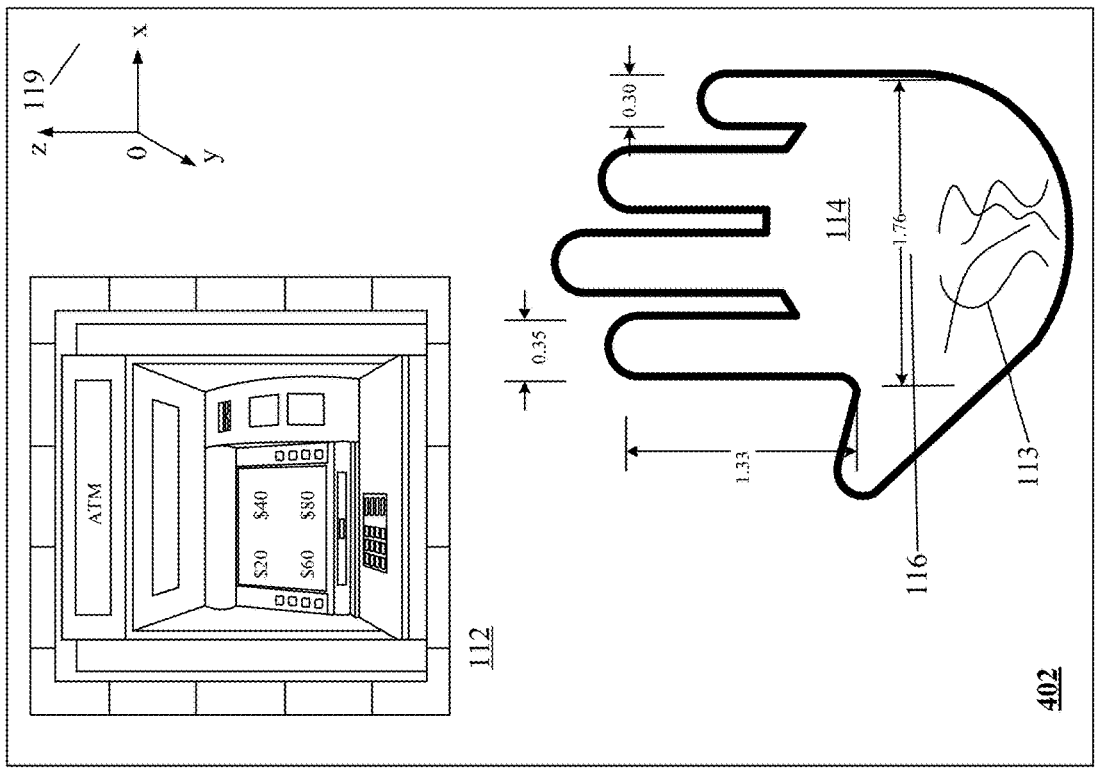

FIG. 4 illustrates training a sensor equipped device 101 to recognize a user by biometric features identified from a portion of the user's body and recognizing the user by comparing a biometric profile set built from the user's biometric features with previously recognized biometric features of the user in accordance with the technology disclosed. FIG. 4 shows two views 402, 404 of hand 114 within region of interest 112 of device 101 at two different times, training time $t_0$ (402), and authentication time $t_1$ (404), which can be moments or months apart. Further, views 402, 404 can be at different device 101 instances, which can be coupled to share data by a network or the like. In other words, a user might train a first device 101 instance to recognize the user's hand 114 in block 402, and subsequently authenticate at a second device 101 instance in block 404. As shown in block 402, at an initial training time $t_0$, hand 114 is in a particular position and configuration in region of interest 112. Block 402 illustrates a representative pose of a particular user's hand 114 during a learning phase in which biometric features of the hand 114 visible to cameras 102, 104 are identified by system 100 of device 101 and used to build a biometric model based upon one or more biometric feature(s) of the user hand 114. During training, a user's hand can adopt a variety of poses, e.g., palm facing camera(s), palm facing away from camera(s), and so forth, however only one training pose is shown in block 402 for clarity sake. The user can be prompted to assume various hand poses and at various locations and distances relative to device 101. Device 101 captures one or more images of objects 114 (hands) in a particular pose(s) present within region of interest 112. From images of the hand 114, one or more biometric features (e.g., vein patterns 113, measurements 116 across the palm or at other specific locations, palm prints or patterns, complexion, body temperature indicated by visual cues, other individual specific features and any combination thereof) visible to cameras 102, 104 are identified based upon one or more image characteristics using a process like flowchart 500 of FIG. 5. One or more identified biometric features useful to identify hand 114 comprise a biometric profile set. A biometric model specific to an individual can be built from one or more biometric profile sets, e.g., a first profile set of biometric features for a palm view of the individual's hand, a second profile set of features for a backhand view of the individual's hand, and so forth. Additionally, biometric models can comprise non-visible biometric features determined for an individual using other sensors 108, 110 alone, or in conjunction with cameras 102, 104.

Now again with reference to FIG. 4, in block 404, the user's hand 114 is captured during authentication at authentication time $t_1$. Certain biometric features 113, 116 (vein patterns, palm prints, fingerprints, other features, combinations thereof) can provide useful biometric features for authentication. During authentication, device 101 captures one or more images of hand 114 being authenticated. Characteristics of the image are analyzed with respect to one or more properties to determine biometric features. The biometric features from the hand 114 under authentication are compared with normalized biometric features of one or more biometric profiles built for the user during training in block 402. Biometric features are normalized (e.g., compensated for rotation, translate, and depth) using for example technique(s) like those discussed with reference to FIG. 6 below, since the user's hand 114 is not in the same pose (and may not even be viewed by the same device 101) at authentication time $t_1$ as it was during training time $t_0$. Accordingly, the apparent position of biometric features 113, 116 in the region of interest 112 in block 404 will change from the apparent position of the biometric features 113, 116 in region of interest 112 in block 402. Thus, apparent differences in the biometric features 113, 116 due to the change in position of the hand 114 relative to the device 101, and/or differences in construction between various implementations of device 101, are taken into account by normalizing biometric features during authentication to enable device 101 to identify hand 114 in the pose of block 404 as being the hand 114 trained in the pose of block 402 using a process like that described below with reference to FIG. 6.

Figure 5:
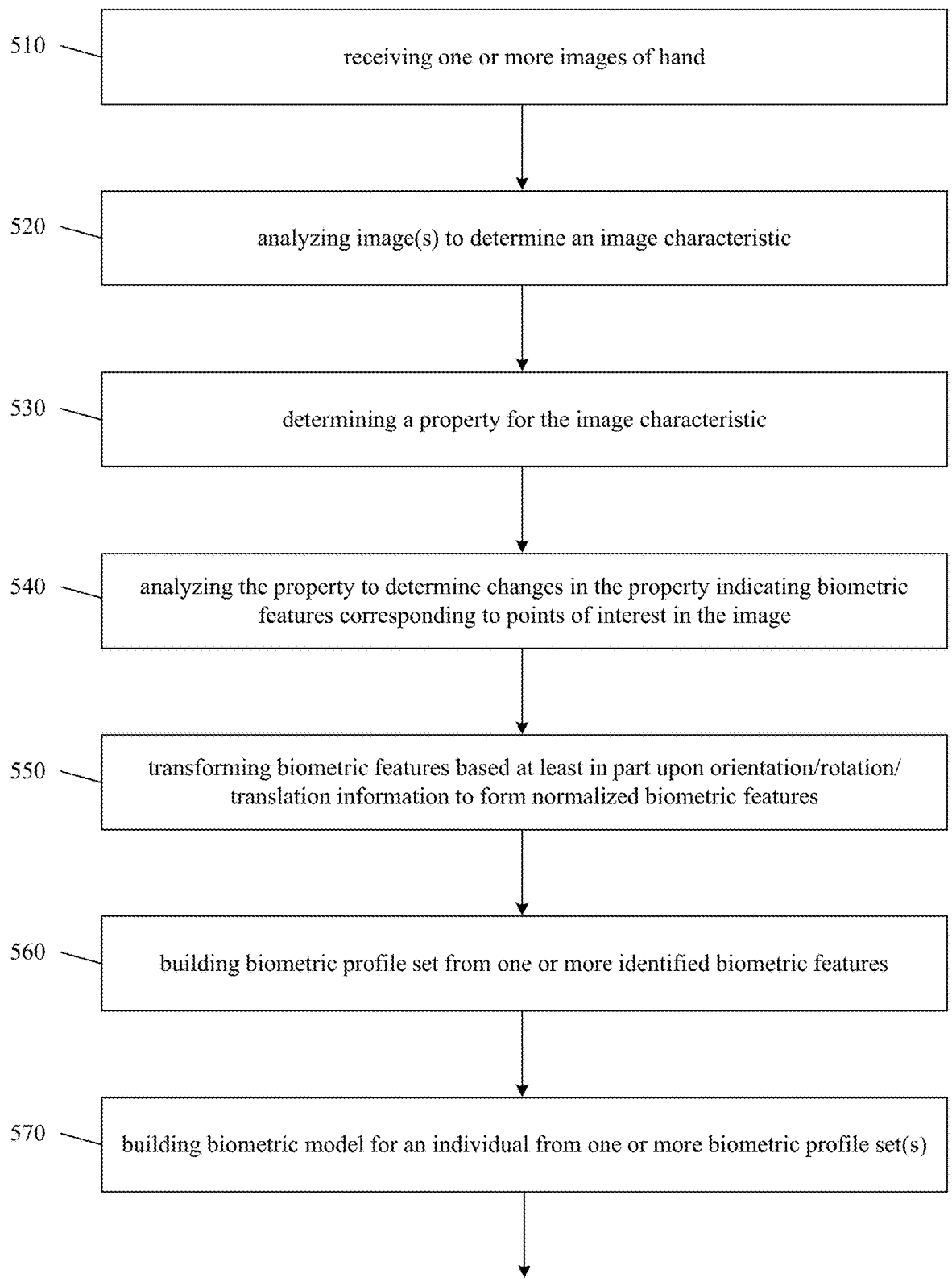
FIG. 5 shows a flowchart of one implementation of determining a biometric profile for a user using one or more types of biometric features gathered by a sensor apparatus in accordance with the technology disclosed.

FIG. 5 shows a flowchart 500 of one implementation of determining a biometric profile for a user using one or more types of biometric features determined from information gathered by a sensor apparatus. Flowchart 500 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 5. Multiple actions can be combined in some implementations. For convenience, this flowchart is described with reference to the system that carries out a method. The system is not necessarily part of the method.

In flowchart 500, sensory processing system 106 of device 101 gathers image(s) of hand 114 and processes the image information to identify biometric features 113, 116 of the hand 114 for biometric identification or other purposes. In an action 510, sensory processing system 106 captures one or more images of hand 114. Images can be of any of a variety of types depending upon implementation, but in the example implementation of FIG. 5, one or more monochromatic images are received. In the event that more than one camera 102, 104 captures images of region of interest 112, any of a variety of stereo-imaging techniques can be employed to obtain scene information from the images. In an action 520, the image(s) can be analyzed to determine an image characteristic for various points in the image. Depending upon implementation, any of a variety of image characteristics can be used, but in the example implementation of FIG. 5, brightness (intensity) I is analyzed as a function of position within the image(s) I=$f_{(x,y)}$. In an action 530, a property is determined for the image characteristic at various points of interest in the image. For example, one property can indicate how the image characteristic is undergoing change in various points in the image. A variety of techniques can be used in various implementations to determine the image property, but in the example implementation of FIG. 5, a gradient is applied to the (intensity) I as a function of position within the image(s) to analyze the image characteristic for change, as indicated by equation (1):

$$\nabla I_{(x,y)} = \begin{bmatrix} \frac{\partial I}{\partial x} \\ \frac{\partial I}{\partial y} \end{bmatrix} \quad (1)$$

The gradient ∇I (x, y) represents the slope of a tangent to a graph of the intensity I=$f_{(x,y)}$. A gradient can provide a vector at each point (x, y) that points in the direction of the greatest rate of increase in the intensity I and having a magnitude indicating a slope of a graph in that direction. In an action 540, the image property can be analyzed to determine changes in the property indicating points of interest in the image. For example, one analysis technique includes determining a secondary property, such as curvature, based upon the image property (e.g., gradient) determined in action 530, forming a Hessian matrix as indicated by equation (2):

$$\nabla^2 I_{(x,y)} = \begin{bmatrix} \frac{\partial^2 I}{\partial x^2} & \frac{\partial^2 I}{\partial x \partial y} \\ \frac{\partial^2 I}{\partial x \partial y} & \frac{\partial^2 I}{\partial y^2} \end{bmatrix} \quad (2)$$

The curvature $\nabla^2 I$ (x, y) represents how the change in intensity I is changing over each pixel in the image(s). In an implementation, changes in the property are defined by one or more maximal and/or minimal changes in intensity I. For example, changes in the property indicating points of interest can be identified using one or more eigenvalues and eigenvectors determined from the matrix of equation (2). In one implementation an Eigen solver can be used, such as for example, Eigen Solver, a package available from Eigen at http://eigen.tuxfamily.org/dox/classEigen_1_1Eigen-Solver.html can be used to obtain eigenvectors and eigenvalues from matrix of equation (2). In an implementation, a Singular Value Decomposition (SVD) function can be used. A package for solving SVD available from Eigen at http://eigen.tuxfamily.org/dox/group_SVD_Module.html can be used to obtain eigenvectors and eigenvalues from a product formed by the matrix of equation (2) and the transpose of the matrix of equation (2).

Eigenvectors indicate maximal and minimal changes in the intensity I of points in the image. Eigenvalues indicate the quantity of the changes in the intensity I. For example, minimal change is indicative of following a curve of a feature in the image (e.g., tracing along a vein or a palm line) because the intensity I will tend to vary relatively slowly along the curve of the feature. Maximal change is indicative of encountering a boundary of a feature in the image because the intensity I will tend to vary relatively rapidly across a feature boundary.

Figure 6:
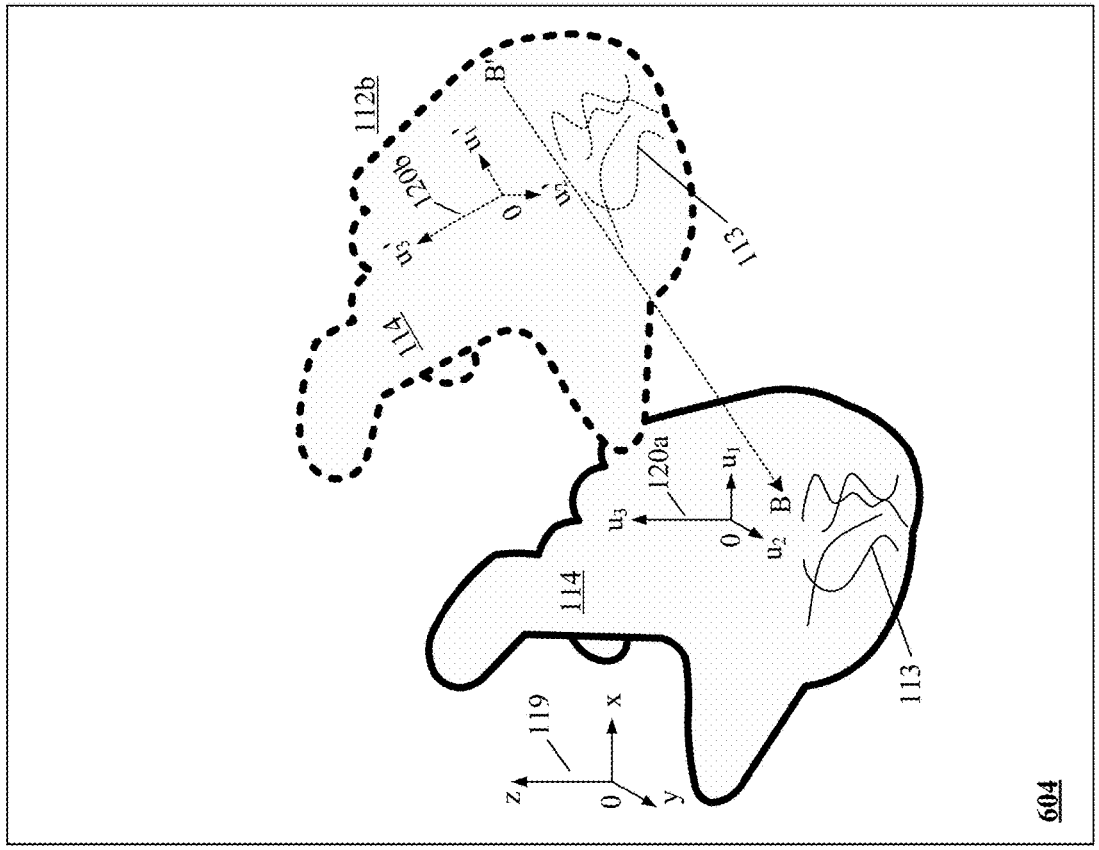
FIG. 6 illustrates acquisition of one or more normalized biometric features during training and comparison of biometric features captured from a subject hand being authenticated.
Figure 6:
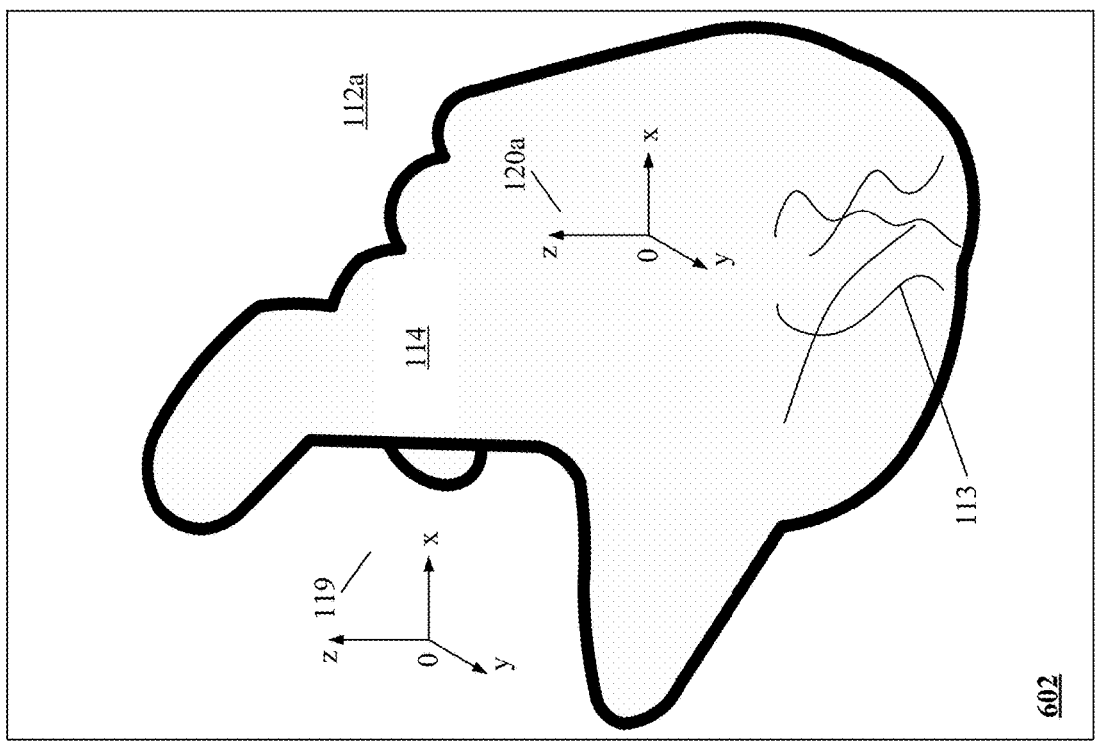

In an action 550, biometric features are transformed to form normalized biometric features. Biometric features are captured relative to the frame of reference of the hand 114 in the image. Transforming forms biometric features normalized to the reference frame of a model of hand, which enables comparison with features of biometric information of users retrieved from storage (e.g., database(s) of user's biometric information). In an implementation, biometric features of hand 114 as captured, are transformed to normalized biometric features by application of transformation information indicating (e.g., rotation, translation, and/or scaling) of the hand 114 in a captured pose to a known pose that serves as a reference. Once transformed, the normalized features can be compared with normalized biometric features of known authorized users taught using the known pose (or known poses). As shown in FIG. 6 and discussed further below, one implementation In an implementation, a transformation $R^T$ is determined that moves captured (dash-lined) reference frame 120b to model (solid-lined) reference frame 120a. Applying the transformation $R^T$ makes the captured (dash-lined) reference frame 120b lie on top of model (solid-lined) reference frame 120a.

In an action 560, a biometric profile set is built from one or more identified biometric features. For example, biometric profile sets can be constructed for biometric features visible from a palm facing camera view, biometric features visible from a back hand facing the camera view, a closed fist view, and so forth. Each such configuration can serve as a basis for a biometric profile set that is based upon the biometric features (e.g., palm lines, veins, fingerprints, scars, finger width at first knuckle, and so forth) discerned from the image(s) of the hand in that particular configuration (using e.g., processing according to actions 510-530).

In an action 570, a biometric model specific to an individual can be built from one or more biometric profile sets created in action 560. For example, a biometric model for a user's hand can comprise a first profile set of biometric features for a palm view of the individual's hand, a second profile set of features for a backhand view of the individual's hand, and so forth. Accordingly, a biometric model for an individual can comprise one or more such biometric profile sets for the individual. In some implementations, biometric profile sets can include other portions of the user's anatomy, e.g., iris or retinal scans, finger prints, breathing/heartbeat/pulse patterns or profile characteristics, voice prints, speech patterns, ambient body temperatures, and so forth.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as summary, brief description of the drawings, detailed description, claims, etc.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

Now with reference to FIG. 6, which illustrates acquisition of one or more normalized biometric features by the device 101 during training and comparison of biometric features captured from a subject hand being authenticated. During acquiring of biometric features to build a biometric profile set, as shown by block 602, field of view 112*a* presented to device 101 at training time $t_0$ includes hand 114 which is to be biometrically modeled. At training time $t_0$, the biometric features 113, 116 (e.g., of hand 114) are determined with respect to model reference frame 120*a* e.g., by processing image data from cameras 102, 104 viewing hand 114. Biometric profile sets comprising one or more biometric features normalized to model reference frame 120*a* are built from the biometric features. A biometric model of the user can be constructed based upon one or more biometric profile sets.

When comparing biometric features from a captured pose of a hand 114 to be authenticated, as shown by block 604, at authentication time $t_1$, field of view 112*b* presented by device 101 at authentication time $t_1$ includes hand 114 in a new apparent position. Not only is the hand 114 in a different position when authenticated vs. when taught, it is likely that the hand 114 is authenticated at a different installation of device 101 at a different location when using the device 101 from when characteristics of the hand 114 were originally taught to one of the device 101 installations. Accordingly, the reference frame 120*b* of the hand as captured during authentication will have moved from an original or starting hand reference frame 120*a* as described by a transformation $R^T$. It is noteworthy that application of the transformation $R^T$ enables the hand 114 to be compared and/or recognized when rotated as well as translated relative to a taught pose of hand 114. Implementations can provide transforming the position and rotation of reference frame 120*b* with respect to reference frame 120*a* and therefore, transforming the position and rotation of tracked subject 113 with respect to 120*b*, at authentication time $t_1$. Implementations can determine the position and rotation of tracked subject 113 with respect to 120*a* from the transformed position and rotation of reference frame 120*b* with respect to reference frame 120*a* and the transformed position and rotation of tracked subject 113 with respect to 120*b*.

In an implementation, a transformation $R^T$ is determined that moves captured (dash-lined) reference frame 120*b* to model (solid-lined) reference frame 120*a*. Applying the transformation $R^T$ to any point(s) captured relative to the captured (dash-lined) reference frame 120*b* makes the point(s) lie on top of corresponding point(s) relative to model (solid-lined) reference frame 120*a*. Then the tracked object 114 will be in the right place from the point of view of model (solid-lined) reference frame 120*a* to facilitate recognition, comparison and so forth. In determining the motion of object 114, sensory processing system 106 can determine its location and direction by computationally analyzing images captured by cameras 102, 104 and motion information captured by sensors 108, 110. For example, an apparent position of any point on the object (in 3D space) at capture time $$t=t_1: \begin{bmatrix} x \\ y \\ z \\ 1 \end{bmatrix},$$

can be converted to a position of the point on the original model object at training time $$t=t_0: \begin{bmatrix} x' \\ y' \\ z' \\ 1 \end{bmatrix},$$

using an affine transform $$\begin{bmatrix} R_{ref} & T_{ref} \\ 0 & 1 \end{bmatrix}.$$

The correct location at capture time $t=t_1$ of a point on the tracked object with respect to model reference frame 120*a* is given by equation (3):

$$\begin{bmatrix} R_{ref}^T & (R_{ref}^T)*-T_{ref} \\ 0 & 1 \end{bmatrix} * \begin{bmatrix} x \\ y \\ z \\ 1 \end{bmatrix} = \begin{bmatrix} x' \\ y' \\ z' \\ 1 \end{bmatrix} \quad (3)$$

Where:
$R_{ref}$—Represents an affine transform describing the transformation from the hand reference frame 120*b* to the model reference frame 120*a*.
$T_{ref}$—Represents translation of the hand reference frame 120*b* to the model reference frame 120*a*.

Again with reference to FIG. 6, block 604 illustrates hand reference frame 120b, which can be represented by a 3×3 matrix R'=[u$_1$', u$_2$', u$_3$'] and model frame 120a, which can be represented by a 3×3 matrix R=[u$_1$, u$_2$, u$_3$]. The objective is to transform R' (reference frame 120b) into R (reference frame 120a) so that any point on the hand 114 being authenticated known with reference to frame 120b can be compared to a point or points of the hand 114 as taught (i.e., known) with reference to frame 120a. Accordingly, an affine transform $R^T_{ref}$=R(R')$^T$ will achieve this objective. Affine transform $R^T_{ref}$ can be expressed in terms of R and R' as shown by equation (4):

$$R^T_{ref} = \begin{bmatrix} u_1 \cdot u'_1 & u_1 \cdot u'_2 & u_1 \cdot u'_3 \\ u_2 \cdot u'_1 & u_2 \cdot u'_2 & u_2 \cdot u'_3 \\ u_3 \cdot u'_1 & u_3 \cdot u'_2 & u_3 \cdot u'_3 \end{bmatrix} \quad (4)$$

$$T = \begin{bmatrix} a \\ b \\ c \end{bmatrix}$$

is a vector representing a translation of the object with respect to origin of the coordinate system of the translated frame Translation vector T can be determined using any of various techniques. For example, as noted below with reference to FIG. 7, some implementations determine a tracking model (action 720) in addition to a biometric model. Accordingly, position and orientation information for hand 114 as captured during authentication can be readily obtained from the tracking model, which is maintained to reflect the position and orientation of the hand 114. Vector T can be determined from the difference between position information of some convenient point of reference B (e.g., center of palm, thumb tip, normalize widths or other dimensions of the hand, other points and/or dimensions, or combinations thereof) relative to the hand 114 as captured during authentication (shown schematically in FIG. 6 by point B' of reference frame 120b) and a corresponding point (shown by point B of reference frame 120a) relative to the hand 114 when taught that serves as a reference point.

Figure 7:
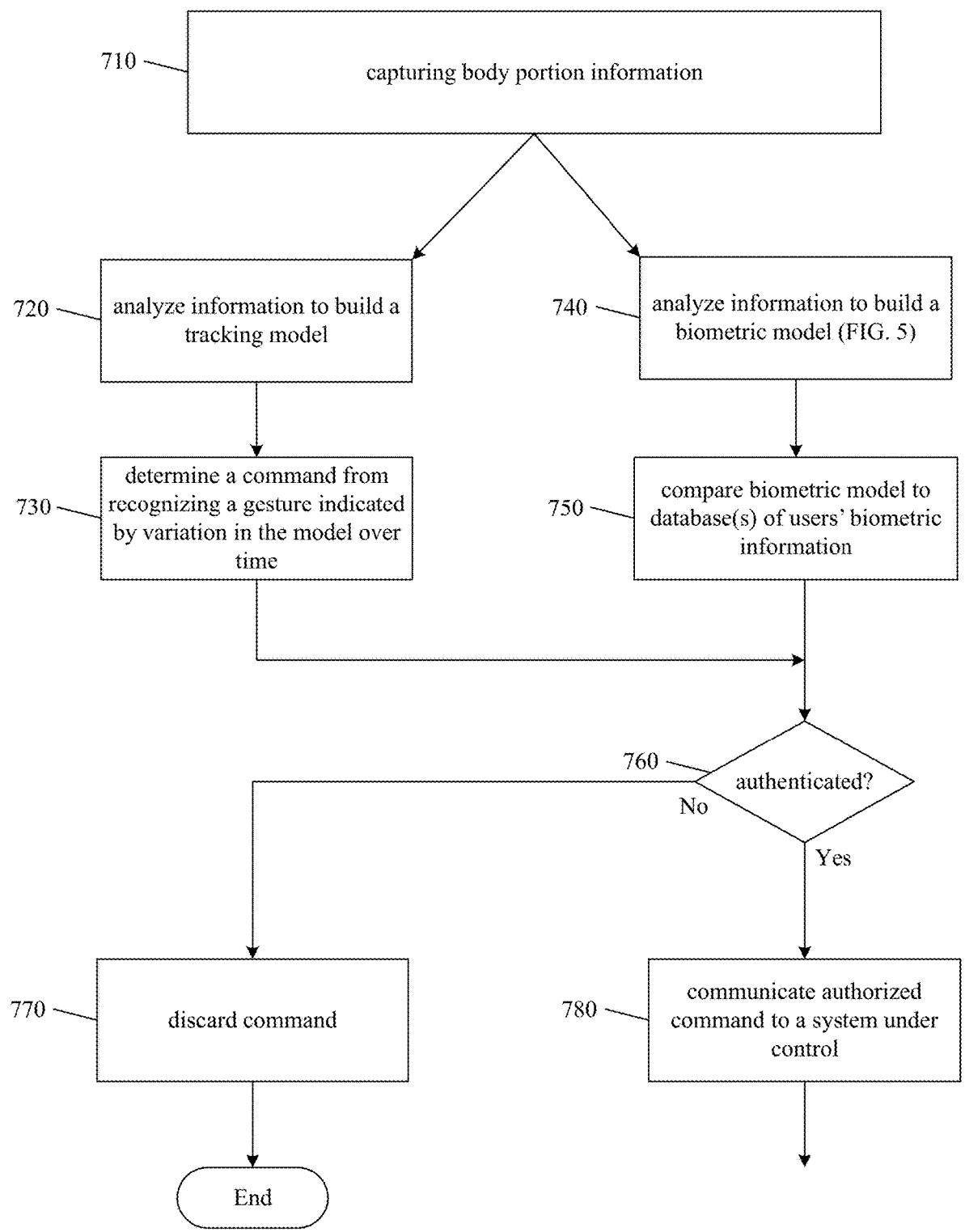
FIG. 7 shows a flowchart of one implementation of authenticating using biometric using a motion sensor apparatus in accordance with the technology disclosed.

FIG. 7 shows a flowchart 700 of one implementation of authenticating using biometric using a motion sensor apparatus 100. Flowchart 700 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 7. Multiple actions can be combined in some implementations. For convenience, this flowchart is described with reference to the system that carries out a method. The system is not necessarily part of the method.

At action 710, body portion information is captured. In one implementation, first object portion information is captured from device 101 including system 100.

At action 720, the body portion information is analyzed and a tracking model is built.

At action 730, a command is determined from recognized gesture(s) indicated by variation in the tracking model over time.

At action 740, body portion information is analyzed and a biometric model is built. A biometric model can be determined using techniques such as discussed above with reference to FIG. 5.

At action 750, the biometric model is compared to known users' biometric information. Biometric information for known users can be stored in one or more database(s). Database(s) of known users can be shared across multiple machines enabling users to authenticate at more than one machine in a system comprised of a plurality of networked machines. Some implementations include authorization profiles, which can be based upon roles (e.g. system administrator, developer, manager, CEO, etc.) assigned to the known users and/or user specific authorizations. Authorizations can include commands that the known user is authorized to perform.

At action 760, a determination is made whether the user is authenticated based upon the results of the comparing in action 750. If the user is authenticated, then in an action 780, an authorized command is communicated to a system under control. For example, an authorized command can include a command to the system to permit the user to login and access menus and functions available to users of the system having the authorization level to which the user has authenticated. Otherwise, if the user is not authenticated, any command information received from the user is discarded in action 770.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as summary, brief description of the drawings, detailed description, claims, etc.

In some implementations, after a user has been authenticated, when a subsequent gesture is recognized, the user's identity is confirmed to remain the same. Confirmation can be obtained by, e.g., ensuring that biometric markers in the hand performing the gesture correspond positively with the biometric model set built when the use authenticated. User commands that cannot be positively attributed to the authenticated user can be discarded, reported to a security center, handled by other means, or combinations thereof).

Some implementations provide personal interaction experience by integrating virtual object(s) into an augmented real environment that can be projected to the user of the device 101. For example, and with reference to FIG. 8, which illustrates an environment provided for the user of a biometric sensory enabled apparatus in accordance with the technology disclosed. System 800 includes a processing system 106 controlling a variety of sensors and projectors, such as for example one or more cameras 102, 104 (or other image sensors) and optionally some illumination sources 115, 117 comprising an imaging system. Optionally, a plurality of acoustical (or other biometric capable) sensors 808, 810 can be included. For example, with reference to FIG. 8, an image of a hand can be superimposed optionally with a transactional amount and projected relative to one or more accounts to indicate transaction(s) involving the accounts (e.g., screenshots 818-820) corresponding to commands indicated by the user's gesturing (e.g., "pull from" or "add to") or a superimposed hand manipulating a virtual sugar object to a virtual coffee object to reflect a command of ordering a coffee with sugar (e.g., screenshot 811) or a hand superimposed over one or more file objects (or other objects representing objects defined within a computing system) to select a particular object for interaction (e.g., screenshot

812). Optionally, the experience can be augmented by the addition of haptic, audio and/or other sensory information projectors. For example, haptic projector 806 can project the feeling of the texture of "grasping" the virtual sugar cube to the reader's finger. Optional audio projector 802 can project the sound of the virtual sugar cube dropping into the coffee in response to detecting the user making a request to drop the sugar cube into the coffee or coins dropping into a purse. For further information on projectors, reference may be had to "Visio-Tactile Projector" YouTube (https://www.youtube-.com/watch?v=Bb0hNMxxewg) (accessed Jan. 15, 2014). In operation, sensors and projectors are oriented toward a region of interest 112, in which an object of interest 114 (in this example, a hand) moves.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

Figure 9:
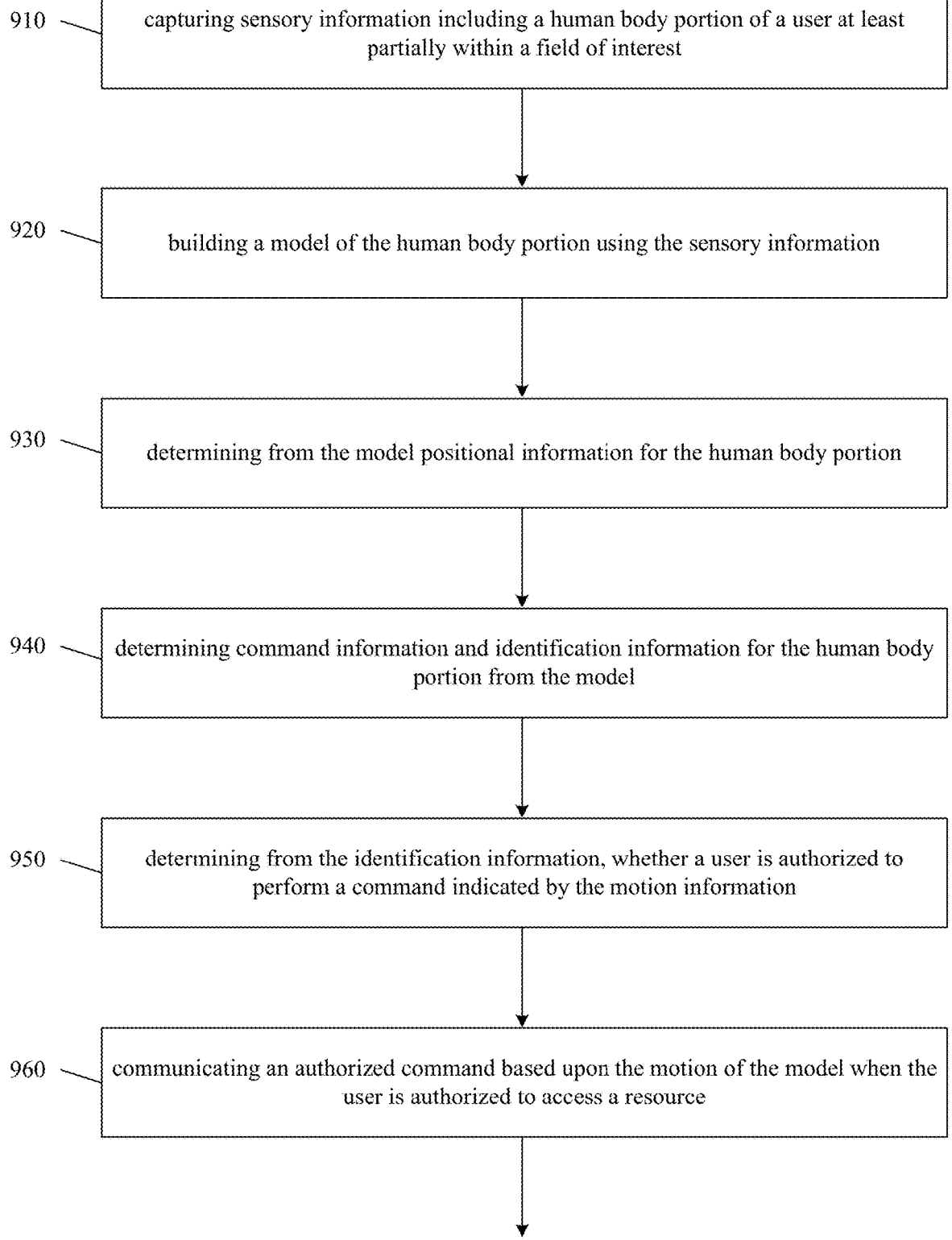
FIG. 9 shows a flowchart of one implementation of authorizing individual commands.

FIG. 9 shows a flowchart 900 of one implementation of authorizing individual commands. Flowchart 900 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 9. Multiple actions can be combined in some implementations. For convenience, this flowchart is described with reference to the system that carries out a method. The system is not necessarily part of the method.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as summary, brief description of the drawings, detailed description, claims, etc.

At action 910, sensory information is captured. Sensory information includes a human body portion of a user at least partially within a field of interest.

At action 920, a model of the human body portion is built using the sensory information.

At action 930, positional information for the human body portion is determined from the model.

At action 940, command information and identification information is determined for the human body portion from the model.

At action 950, whether a user is authorized to perform a command indicated by the motion information is determined from the identification information.

At action 960, an authorized command is communicated based upon the motion of the model when the user is authorized to access a resource.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

Figure 10:
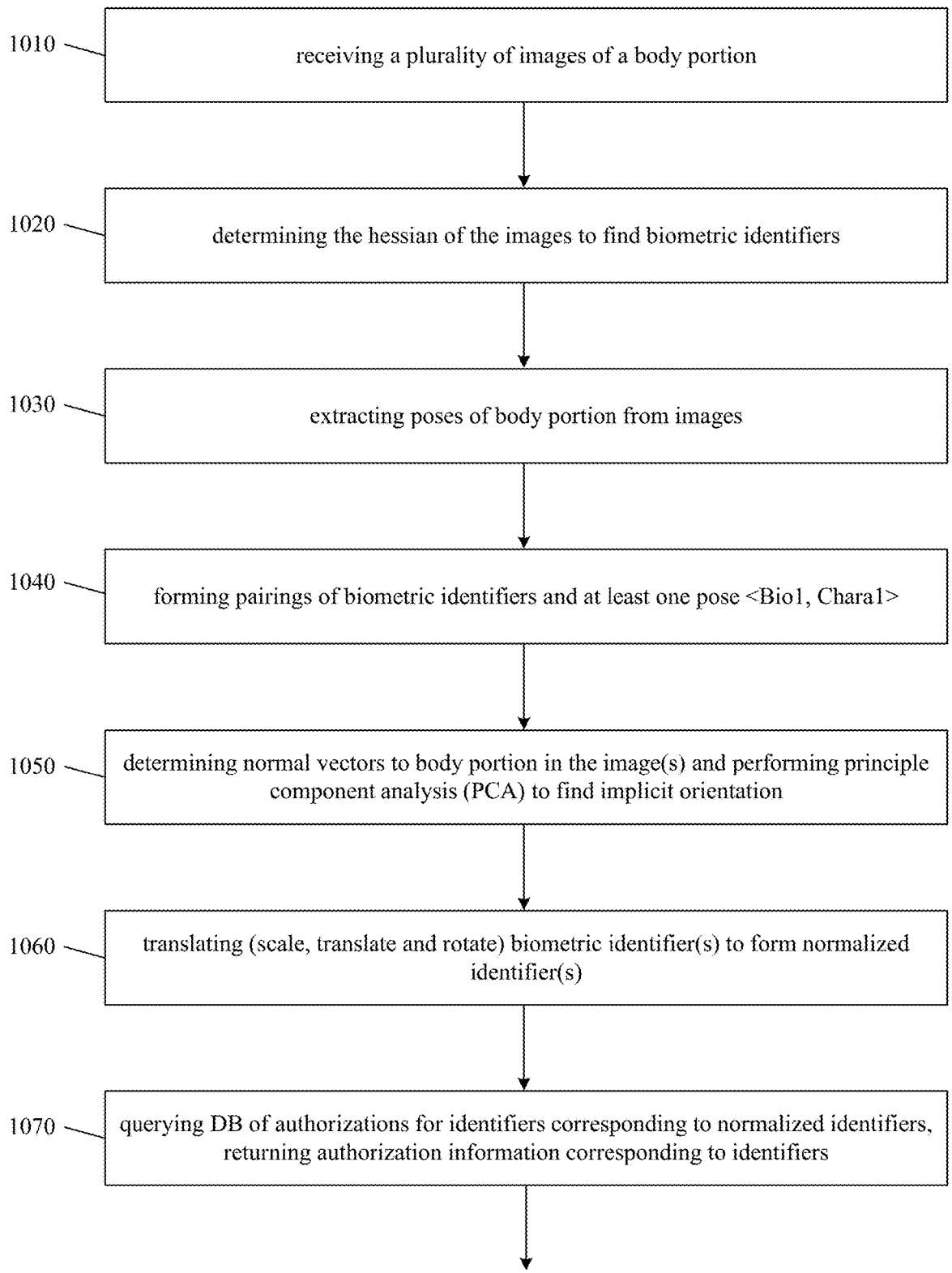
FIG. 10 shows a flowchart of one implementation of determining whether a user is authorized.

FIG. 10 shows a flowchart 1000 of one implementation of determining whether a use is authorized. Flowchart 1000 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 10. Multiple actions can be combined in some implementations. For convenience, this flowchart is described with reference to the system that carries out a method. The system is not necessarily part of the method.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as summary, brief description of the drawings, detailed description, claims, etc.

At action 1010, a plurality of images of a human body portion (e.g., hand) are received.

At action 1020, the hessian of the images is determined. The hessian can enable finding the biometric identifiers.

At action 1030, pose(s) of a body portion are extracted via processing images.

At action 1040, pairings of biometric identifiers and at least one pose of the body portion <Bio1, Chara1> are formed.

At action 1050, normal vectors are determined and used for principle component analysis (PCA) to find implicit orientation of the body portion. In one implementation, normal vectors can be determined for edge points of the body portion in the images. The normal vector will be tangent to the edge point and a ray drawn from the imaging device taking the image (e.g., camera 102, 104) and tangent to the body portion in the image at the edge point. Principle component analysis techniques include determining groupings of the resulting normal vectors by orientation. A predominate population of members of a particular grouping indicates a dominant direction (e.g., orientation of a majority of normal vectors to the hand). For background information about Principle Component Analysis, reference can be had to, "A Tutorial on Principle Component Analysis", http://www.cs.princeton.edu/picasso/mats/PCA-Tutorial-Intuition_jp.pdf (last access Mar. 13, 2014 at 1:06 PM PDT).

At action 1060, biometric identifier(s) are translated (scale, translate and rotate) identifiers to form normalized identifier(s). See, e.g., FIG. 6 and related discussion above.

At action 1070, a DB of authorizations is queried for identifiers corresponding to normalized identifiers, returning authorization information corresponding to identifiers.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

Figure 11:
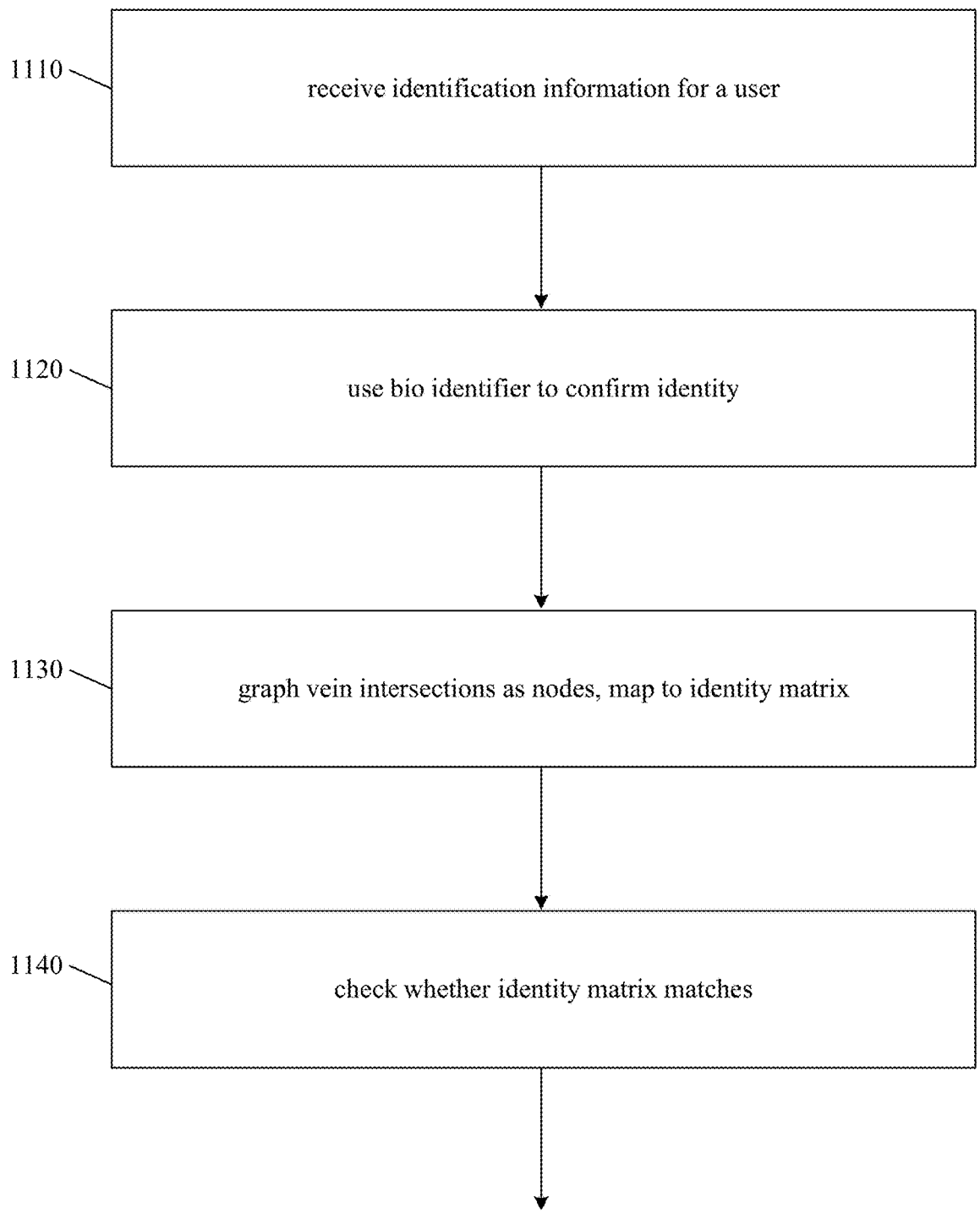
FIG. 11 shows a flowchart of one implementation of confirming bio-identity of a user.

FIG. 11 shows a flowchart 1100 of one implementation of confirming bio-identity of a user. Flowchart 1100 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 11. Multiple actions can be combined in some implementations. For convenience, this flowchart is described with reference to the system that carries out a method. The system is not necessarily part of the method.

At action 1110, identification information for a user is received.

At action 1120, a biometric identifier is used to confirm the user's identity.

At action 1130, one or more vein intersections are mapped to nodes of a graph to form an identity matrix.

At action 1140, matching the identity matrix can be used to check identity of the user.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as summary, brief description of the drawings, detailed description, claims, etc.

In some implementations, motion capture is achieved using an optical motion-capture system. In some implementations, object position tracking is supplemented by measuring a time difference of arrival (TDOA) of audio signals at the contact vibrational sensors and mapping surface locations that satisfy the TDOA, analyzing at least one image, captured by a camera of the optical motion-capture system, of the object in contact with the surface, and using the image analysis to select among the mapped TDOA surface locations as a surface location of the contact.

Reference may be had to the following sources, incorporated herein by reference, for further information regarding computational techniques:
1. Wikipedia, URL: <http://en.wikipedia.org/wiki/Euclidean_group>, on Nov. 4, 2013, 04:08 UTC;
2. Wikipedia, URL: <http://en.wikipedia.org/wiki/Affine_transformation>, on Nov. 25, 2013, 11:01 UTC;
3. Wikipedia, URL: <http://en.wikipedia.org/wiki/Rotation_matrix>, Rotation matrix from axis and angle, on Jan. 30, 2014, 20:12 UTC;
4. Wikipedia, URL: <http://en.wikipedia.org/wiki/Rotation_group_SO(3)>, Axis of rotation, on Jan. 21, 2014, 21:21 UTC;
5. Wikipedia, URL: <http://en.wikipedia.org/wiki/Transformation_matrix>, Affine Transformations, on Jan. 28, 2014, 13:51 UTC; and
6. Wikipedia, URL: <http://en.wikipedia.org/wiki/Axis%E2%80%93angle_representation>, on Jan. 25, 2014, 03:26 UTC.
7. "A Tutorial on Principle Component Analysis," Mar. 25, 2003; available URL: <http://www.cs.princeton.edu/picasso/mats/PCA-Tutorial-Intuition_jp.pdf>, on Mar. 13, 2014 at 1:06 PM PDT.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

Figure 12:
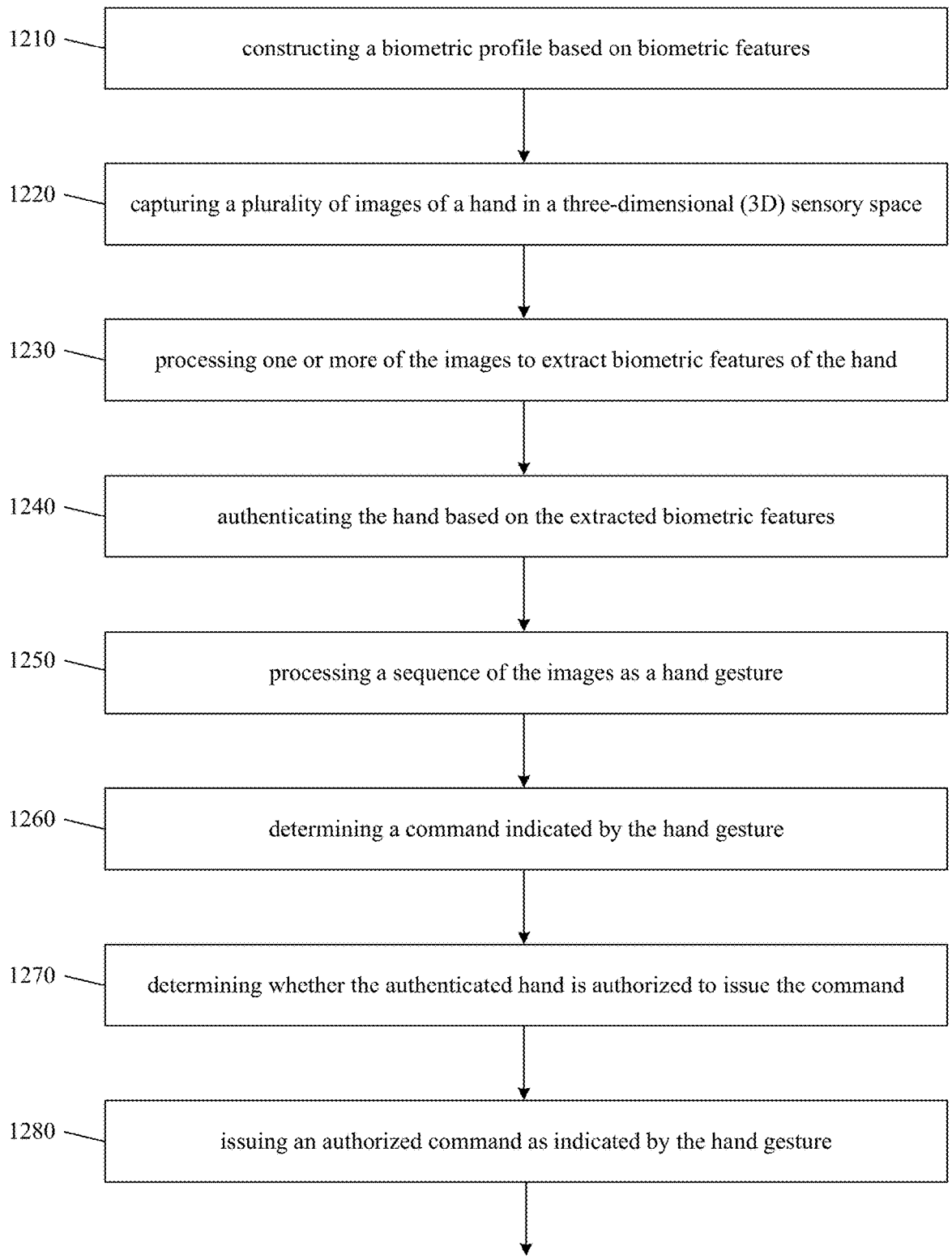
FIG. 12 is a flowchart showing a method of authorizing commands issued by gestures.

FIG. 12 is a flowchart showing a method of authorizing commands issued by gestures. Flowchart 1200 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 12. Multiple actions can be combined in some implementations. For convenience, this flowchart is described with reference to the system that carries out a method. The system is not necessarily part of the method.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as summary, brief description of the drawings, detailed description, claims, etc.

At action 1210, a biometric profile is constructed based on biometric features of a hand performing a hand gesture in a 3D sensory space. Constructing the biometric profile includes prompting a user to perform hand gestures in the 3D sensory space and capturing a plurality of images of the hand during the hand gestures, processing one or more of the images to extract biometric features of the hand, determining normalized biometric features by at least one of rotating, translating, and scaling the biometric features, registering multiple images of different poses of the hand during the hand gestures, and storing the normalized biometric features and corresponding poses for recognizing gestures.

In one implementation, the biometric profile is constructed at a first device and a command authorized based on the biometric features is issued to a second device, as explained in the description below.

At action 1220, a plurality of images of the hand in the 3D sensory space is captured. In some implementations, stereo-imaging is used to capture the plurality of images of the hand.

In other implementations, multiple images of different poses of the hand are registered during the hand gesture. In one implementation, the different poses of the hand include at least one of palm view of the hand, backhand view of the hand, and closed fist view of the hand.

At action 1230, one or more of the images are processed to extract biometric features of the hand. In one implementation, the extracted biometric features include vein patterns of the hand. In another implementation, the extracted biometric features include palm prints of the hand. In yet another implementation, the extracted biometric features include fingerprints of the hand. In a further implementation, the extracted biometric features include at least one of scars of the hand, shape of the hand, size of the hand, measurements across a palm of the hand, finger width at a first knuckle of the hand, and complexion of the hand.

In some implementations, processing one or more of the images to extract biometric features of the hand further includes using at least one image characteristic of the images, determining an image property that specifies changes to the image characteristic across various image points, determining variations to the image property across the various image points, and based on the determined variations, identifying points of interest in the images that represent the biometric features.

In one implementation, processing one or more of the images to extract biometric features of the hand also includes using a Hessian Matrix for determining changes to the image property across the various image points.

In another implementation, processing one or more of the images to extract biometric features of the hand also includes using eigenvalues and eigenvectors for identifying the points of interest. In one implementation, the image characteristic is pixel intensity. In another implementation, the image property is gradient of pixel intensity.

In some implementations, normalized biometric features are determined by at least one of rotating, translating, and scaling the biometric features. Once transformed, the normalized features can be compared with normalized biometric features of known authorized users taught using the known pose (or known poses).

At action 1240, the hand is authenticated based on the extracted biometric features, as described above in this application.

At action 1250, a sequence of the images is processed as a hand gesture. For example, a sequence of images can be correlated to construct a 3D model of the user's hand(s), including its position and shape. A succession of images can be analyzed using the same technique to model motion of the body portion such as free-form gestures. See also, e.g., U.S. patent application Ser. No. 13/414,485 (filed on Mar. 7, 2012) and U.S. Provisional Patent Application Nos. 61/724, 091 (filed on Nov. 8, 2012) and 61/587,554 (filed on Jan. 7, 2012), the entire disclosures of which are hereby incorporated by reference. In low-light or other situations not conducive to optical imaging, where free-form gestures cannot be recognized optically with a sufficient degree of reliability, audio signals or vibrational waves can be detected and used to supply the direction and location of the body portion as further described herein. See also, e.g., U.S. patent application Ser. No. 14/149,709 (filed on Jan. 7, 2014) and U.S. Provisional Patent Application No. 61/927,919 (filed on Jan. 15, 2014).

In some implementations, correlating object positions between images allows for determination of the location of the hand in the 3D sensory space, and analyzing sequences of images allows for reconstruction of 3D motion of hand using motion algorithms or other techniques. In other implementations, such reconstruction can be used to build a 3D model of the hand from which command information can be determined. See, e.g., U.S. patent application Ser. No. 13/414,485 (filed on Mar. 7, 2012) and U.S. Provisional Patent Application Nos. 61/724,091 (filed on Nov. 8, 2012) and 61/587,554 (filed on Jan. 7, 2012), the entire disclosures of which are incorporated by reference above.

At action 1260, a command indicated by the hand gesture is determined. In one implementation, the hand gesture is at least one of an upward swiping gesture, a downward swiping gesture, a rotating gesture, and a grasping gesture.

At action 1270, a determination is made whether the authenticated hand is authorized to issue the command, and issuing an authorized command as indicated by the hand gesture. In other implementations, determining whether the authenticated hand is authorized to issue the command further includes comparing the extracted biometric features to a stored biometric profile.

In some implementations, determining whether the authenticated hand is authorized to issue the command further includes determining whether a user who performs the hand gesture has a role authorized to issue the command. Role information (e.g., system administrator, developer, manager, CEO, and so forth) for the user stored along with biometric information of known users, enables discrimination of user authorization at the command level, i.e., individual commands can be authorized—or blocked—for users based upon the user's role.

Commands authorization can include determining from profile information stored for the known users, whether an authenticated user having the biometric profile is in a role (e.g., system administrator, developer, manager, and so forth) authorized to issue the command determined from tracking the user's hand (or other body) activity. If the user is determined to be authorized to issue the command based at least in part upon the role, the authorized command is communicated to a system being controlled.

In some implementations, responsive to authenticating the hand based on the extracted biometric features, subsequent hand gestures are interpreted based on specific interpretation criteria.

At action 1280, an authorized command is issued as indicated by the hand gesture. In other implementations, the authorized command is issued to a security aware device, e.g., automated teller machines (ATMs), cash registers and banking machines, other secure vending or service machines, security screening apparatus, secure terminals, airplanes, automobiles and so forth that comprise sensors and processors employing optical, audio or vibrational detection mechanisms suitable for providing gesture detection, personal identification, user recognition, authorization of control inputs, and other machine control and/or machine communications applications.

Authorized commands enable users to login to machines and/or systems, to effect transactions, invoke features/functionality, and/or exchange information.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

Figure 13:
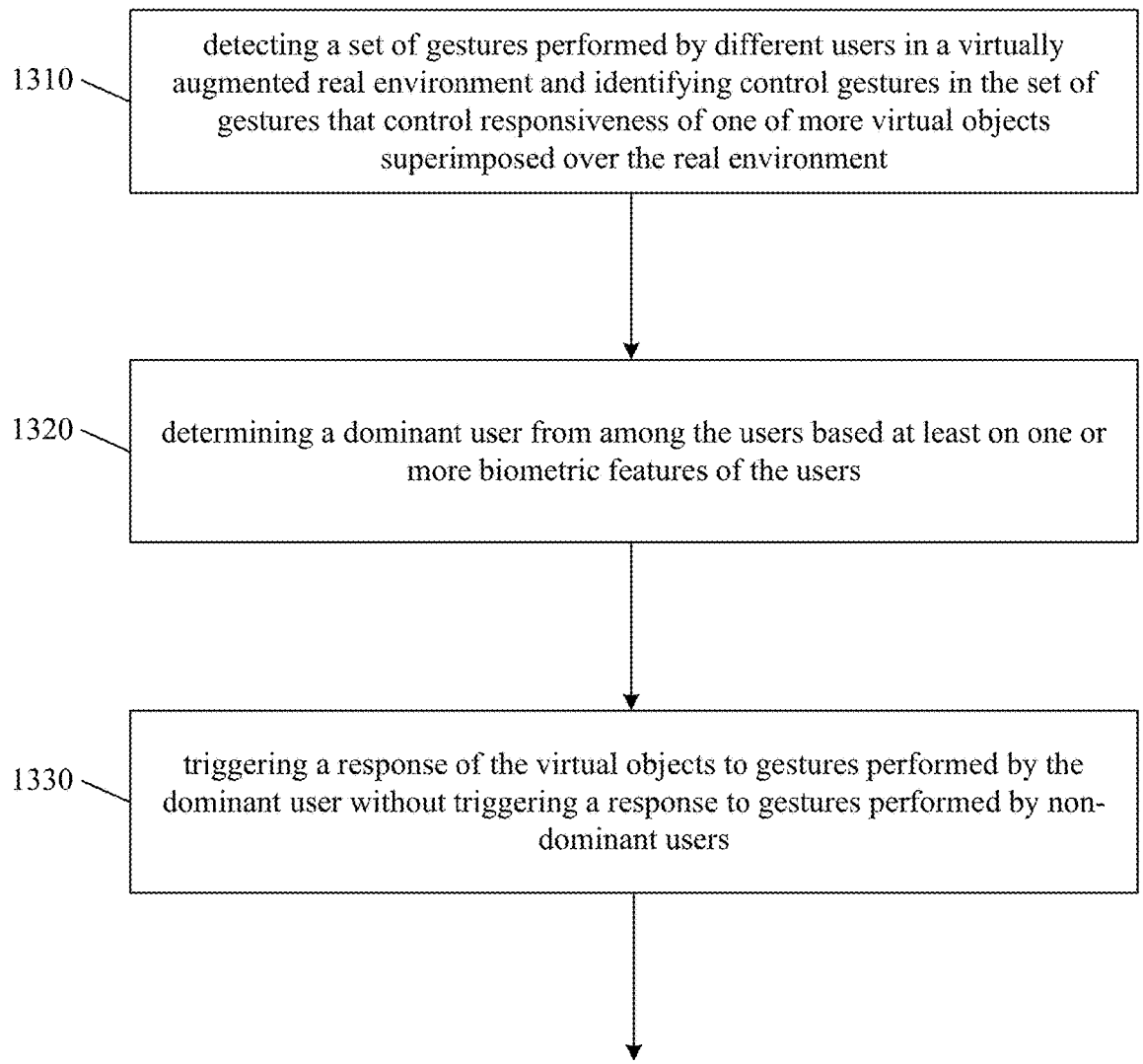
FIG. 13 is a representative method of one implementation of distinguishing control gestures from proximate non-control gestures in a virtually augmented real environment.

FIG. 13 is a representative method of one implementation of distinguishing control gestures from proximate non-control gestures in a virtually augmented real environment. Flowchart 1300 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 13. Multiple actions can be combined in some implementations. For convenience, this flowchart is described with reference to the system that carries out a method. The system is not necessarily part of the method.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as summary, brief description of the drawings, detailed description, claims, etc.

At action 1310, a set of gestures performed by different users is detected in a virtually augmented real environment and identifying control gestures in the set of gestures that control responsiveness of one of more virtual objects superimposed over the real environment.

At action 1320, a dominant user is determined from among the users based at least on one or more biometric features of the users.

At action 1330, a response of the virtual objects to gestures performed by the dominant user is triggered without triggering a response to gestures performed by non-dominant users.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

While the disclosed technology has been described with respect to specific implementations, one skilled in the art will recognize that numerous modifications are possible. The number, types and arrangement of cameras and sensors can be varied. The cameras' capabilities, including frame rate, spatial resolution, and intensity resolution, can also be varied as desired. The sensors' capabilities, including sensitively levels and calibration, can also be varied as desired. Light sources are optional and can be operated in continuous or pulsed mode. The systems described herein provide images and audio signals to facilitate tracking movement of an object, and this information can be used for numerous purposes, of which position and/or motion detection is just one among many possibilities.

Threshold cutoffs and other specific criteria for distinguishing object from background can be adapted for particular hardware and particular environments. Frequency filters and other specific criteria for distinguishing visual or audio signals from background noise can be adapted for particular cameras or sensors and particular devices. In some implementations, the system can be calibrated for a particular environment or application, e.g., by adjusting frequency filters, threshold criteria, and so on.

Any type of object can be the subject of motion capture using these techniques, and various aspects of the implementation can be optimized for a particular object. For example, the type and positions of cameras and/or other sensors can be selected based on the size of the object whose motion is to be captured, the space in which motion is to be captured, and/or the medium of the surface through which audio signals propagate. Analysis techniques in accordance with implementations of the technology disclosed can be implemented as algorithms in any suitable computer language and executed on programmable processors. Alternatively, some or all of the algorithms can be implemented in fixed-function logic circuits, and such circuits can be designed and fabricated using conventional or other tools.

Computer programs incorporating various features of the technology disclosed may be encoded on various computer readable storage media; suitable media include magnetic disk or tape, optical storage media such as compact disk (CD) or DVD (digital versatile disk), flash memory, and any other non-transitory medium capable of holding data in a computer-readable form. Computer-readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download.

Thus, although the disclosed technology has been described with respect to specific implementations, it will be appreciated that the disclosed technology is intended to cover all modifications and equivalents within the scope of the following claims.

What is claimed is:

1. A method of finding an authorized command issued by gesture of a hand moving freely in 3D sensory space, the method including:
   capturing a plurality of images of a hand while the hand makes a hand gesture in a three-dimensional (3D) sensory space;
   obtaining at least one of: one or more scars of the hand; a vein pattern of the hand; and a palm print of the hand extracted from the images of the hand;
   authenticating the hand based on the at least one of: one or more scars of the hand; a vein pattern of the hand; and a palm print of the hand extracted from the images of the hand;
   obtaining a command determined from a hand gesture identified in at least a subset of the plurality of images;
   determining whether the hand as authenticated based on the at least one of: one or more scars of the hand; a vein pattern of the hand; and a palm print of the hand extracted from the images is authorized to issue the command determined from the hand gesture identified in at least a subset of the plurality of images; and
   issuing the command when authorized to a security aware device, wherein the command indicates a financial transaction involving an account associated with the hand as authenticated.

2. The method of claim 1, further including rejecting the command whenever the authenticated hand is determined unauthorized to issue the command.

3. The method of claim 1, further including triggering a response to gestures performed by an authenticated hand authorized to issue a command without triggering a response to gestures performed by non-authenticated hands.

4. The method of claim 1, further including authenticating a second hand captured in the plurality of images when the second hand belongs to a user authorized to issue commands.

5. The method of claim 1, further including extracting at least one of:
   shape of the hand;
   size of the hand;
   measurements across a palm of the hand;
   finger width at a first knuckle of the hand; and
   complexion of the hand.

6. The method of claim 1, further including:
   registering multiple images of different poses of the hand during the hand gesture.

7. The method of claim 6, wherein the multiple images of different poses of the hand include at least one of:
   palm view of the hand;
   backhand view of the hand; and
   closed fist view of the hand.

8. The method of claim 1, further including:
   responsive to the authenticating of the hand based on the at least one of: one or more scars of the hand; a vein pattern of the hand; and a palm print of the hand extracted from the images of the hand, interpreting subsequent hand gestures based on specific interpretation criteria.

9. The method of claim 1, wherein the at least one of: one or more scars of the hand; a vein pattern of the hand; and a palm print of the hand are extracted from the images of the hand by processing that includes:
using at least one image characteristic of the images, determining an image property that specifies changes to the image characteristic across various image points;
determining variations to the image property across the various image points; and
based on the variations determined, identifying points of interest in the images that represent biometric features.

10. The method of claim 9, further including:
using a Hessian Matrix for determining changes to the image property across the various image points.

11. The method of claim 9, further including:
using eigenvalues and eigenvectors for identifying the points of interest.

12. The method of claim 9, wherein the image characteristic is pixel intensity.

13. The method of claim 9, wherein the image property is gradient of pixel intensity.

14. The method of claim 9, further including:
determining normalized biometric features by at least one of rotating, translating, and scaling biometric features.

15. The method of claim 9, wherein the determining of whether the hand is authorized to issue the command further includes:
comparing the biometric features to a stored biometric profile.

16. The method of claim 15, further including:
constructing a biometric profile based on the biometric features, including:
prompting a user to perform hand gestures in the 3D sensory space and capturing a plurality of images of the hand during the hand gestures;
processing one or more of the images to extract biometric features of the hand;
determining normalized biometric features by at least one of rotating, translating, and scaling biometric features;
registering multiple images of different poses of the hand during the hand gestures; and
storing the normalized biometric features and corresponding poses for recognizing gestures.

17. The method of claim 1, wherein the determining of whether the hand is authorized to issue the command further includes:
determining whether a user who performs the hand gesture has a role authorized to issue the command.

18. The method of claim 1, wherein a biometric profile is constructed at a first device and an authorized command is issued to a second device.

19. A non-transitory, computer-readable medium having computer executable instructions for performing a method comprising:
capturing a plurality of images of a hand while the hand makes a hand gesture in a three-dimensional (3D) sensory space;
obtaining at least one of: one or more scars of the hand; a vein pattern of the hand; and a palm print of the hand extracted from the images of the hand;
authenticating the hand based on the at least one of: one or more scars of the hand; a vein pattern of the hand; and a palm print of the hand extracted from the images of the hand;
obtaining a command determined from a hand gesture identified in at least a subset of the plurality of images;
determining whether the hand as authenticated based on the at least one of: one or more scars of the hand; a vein pattern of the hand; and a palm print of the hand extracted from the images is authorized to issue the command determined from the hand gesture identified in at least a subset of the plurality of images; and
issuing the command when authorized to a security aware device, wherein the command indicates a financial transaction involving an account associated with the hand as authenticated.

20. A computer system with one or more processors adapted to perform a method comprising:
capturing a plurality of images of a hand while the hand makes a hand gesture in a three-dimensional (3D) sensory space proximate to, but not in contact with, a surface of a security aware device;
processing the images of the hand to extract one or more biometric features of the hand including at least one of: one or more scars of the hand; a vein pattern of the hand; and a palm print of the hand;
authenticating the hand based on the extracted biometric features of the hand;
processing a sequence of images of the plurality of images to interpret the hand gesture;
determining a command indicated by the hand gesture;
determining whether the authenticated hand is authorized to issue the command; and
issuing the command when authorized to a security aware device, wherein the command indicates a financial transaction involving an account associated with the hand as authenticated.

* * * * *